(12) United States Patent
Nishi et al.

(10) Patent No.: US 7,287,065 B2
(45) Date of Patent: Oct. 23, 2007

(54) DATA DISTRIBUTION SYSTEM AND NETWORK CACHE APPARATUS, DATA DISTRIBUTION SERVER, AND ACCESS SERVER USED FOR THE SAME

(75) Inventors: Tetsuya Nishi, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 798 days.

(21) Appl. No.: 10/099,838

(22) Filed: Mar. 15, 2002

(65) Prior Publication Data

US 2002/0198959 A1 Dec. 26, 2002

(30) Foreign Application Priority Data

Jun. 12, 2001 (JP) ............................. 2001-177181

(51) Int. Cl.
*G06F 15/16* (2006.01)
(52) U.S. Cl. .................. 709/219; 709/217; 709/218; 709/235; 398/50; 398/79
(58) Field of Classification Search ........ 709/217–219, 709/201–203, 235; 370/222, 225–228, 389–395.1; 398/50, 75
See application file for complete search history.

(56) References Cited

U.S. PATENT DOCUMENTS

| | | | | |
|---|---|---|---|---|
| 5,123,099 A | * | 6/1992 | Shibata et al. ............... | 711/120 |
| 5,253,248 A | * | 10/1993 | Dravida et al. .............. | 370/228 |
| 5,583,994 A | * | 12/1996 | Rangan ....................... | 709/219 |
| 6,151,633 A | * | 11/2000 | Hurst et al. ................. | 709/235 |
| 6,208,619 B1 | | 3/2001 | Takeuchi | |
| 6,392,991 B1 | * | 5/2002 | Yamamoto et al. ......... | 370/222 |
| 6,405,256 B1 | * | 6/2002 | Lin et al. .................... | 709/231 |
| 6,425,005 B1 | * | 7/2002 | Dugan et al. ............... | 709/223 |
| 6,542,505 B1 | * | 4/2003 | Shiota ....................... | 370/395.1 |
| 2001/0049730 A1 | * | 12/2001 | Brendes et al. ............. | 709/223 |
| 2002/0035642 A1 | * | 3/2002 | Clarke et al. ............... | 709/244 |

FOREIGN PATENT DOCUMENTS

| | | |
|---|---|---|
| EP | 0 967 559 A1 | 12/1999 |
| EP | 967559 A1 * | 12/1999 |
| JP | 10271132 | 10/1998 |

OTHER PUBLICATIONS

Zhong, W.D; Lacey, J.P.R; Tucker, R.S., "Multiwavelength cross-connects for optical transport networks", Lightwave Technology, Journal of vol. 14, Issue 7, Jul. 1996 pp. 1613-1620 [retrieved IEEE database Apr. 12, 2005].*

* cited by examiner

*Primary Examiner*—Glenton B. Burgess
*Assistant Examiner*—LaShanya R. Nash
(74) *Attorney, Agent, or Firm*—Kattan Muchin Rosenman LLP

(57) ABSTRACT

A data distribution system capable of suppressing a fall of the efficiency of operation of a network due to repeated data retransmission in the network when distributing a large volume of data from a data distribution server on a data provider side to a data receiver side access server via the network. This data distribution system is comprised by a data distribution server, an access server for transferring intended data to each user, and a network cache apparatus provided in the network and having a cache function unit for temporarily storing the data from the data distribution server and an exchange function unit for routing the stored data to the access server corresponding to the destination user.

18 Claims, 21 Drawing Sheets

FIG.7

| ACCESS SERVER DISTRIBUTION ADDRESS | DESTINATION LIST |
|---|---|
| 160.150.140.255 | AC SERVER #1 |
| | AC SERVER #2 |
| | ⋮ |
| | AC SERVER #n |

ACCESS SERVER DISTRIBUTION ROUTING TABLE

FIG.10

| NW CACHE APPARATUS DISTRIBUTION ADDRESS | DESTINATION LIST |
|---|---|
| 230.255.255.255 | NW CACHE APPARATUS #1 |
| | NW CACHE APPARATUS #2 |
| | ⋮ |
| | NW CACHE APPARATUS #m |

NETWORK CACHE APPARATUS DISTRIBUTION ROUTING TABLE

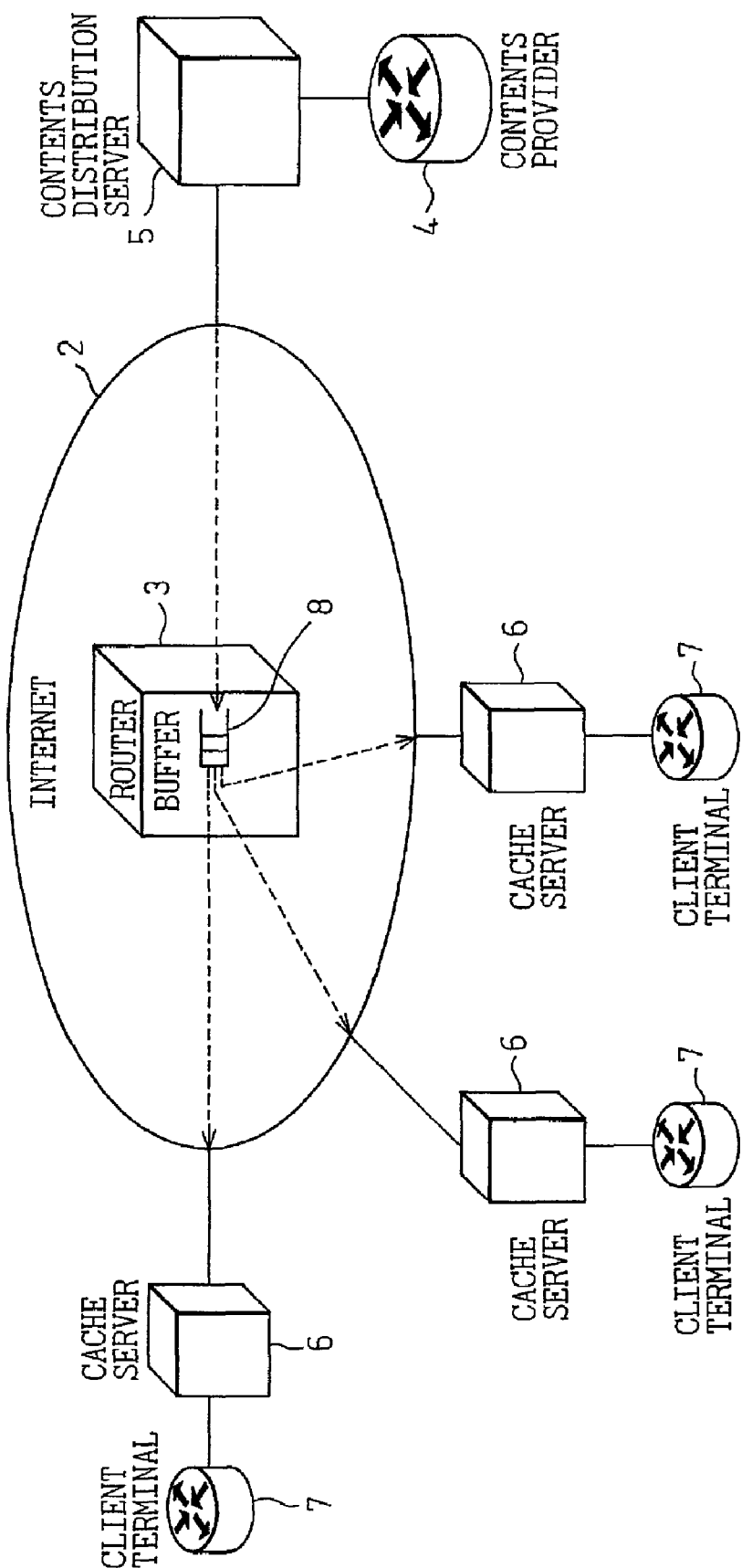

DATA DISTRIBUTION SYSTEM AND NETWORK CACHE APPARATUS, DATA DISTRIBUTION SERVER, AND ACCESS SERVER USED FOR THE SAME

BACKGROUND OF THE INVENTION

1. Field of the Invention

The present invention relates to a data distribution system, more particularly relates to a data distribution system suitable for distributing a large volume of data like movies and music to users from a data provider (content provider).

2. Description of the Related Art

As will be explained later by referring to the drawings, the following problems occur in the data distribution system comprised by a network, a router, a cache server, and a distribution server.

There are a plurality of routers in a network. Data is transferred to a target cache server while sequentially relayed by these routers. In this case, collision of the data may occur at an incoming port or an outgoing port of each router. Also, collision of data may occur also at the cache server on a receiver side.

In order to avoid such collision of data in advance, a buffer is provided in each router, the data is temporarily stored in this buffer, and the data is read out from the buffer at the optimum transmission timing of the data, that is, a timing where collision can be avoided.

However, a buffer does not have a capacity (buffer amount) large enough to hold a large volume of data such as a movie and music for a long time. For this reason, the data has to be discarded if the buffers receive a large volume of data.

If this happens, the related data is repeatedly retransmitted between the routers and the distribution server due to the discarding of the data. Such repeated retransmission of data wastes the resources of the network and in the end results in the problem of fall in the efficiency of operation of the network.

SUMMARY OF THE INVENTION

An object of the present invention is to provide a data distribution system capable of eliminating waste of the network resources due to repeated retransmission of the data and of improving the efficiency of operation of the network.

Another object is to provide a data distribution server, network cache apparatus, and an access server compatible with such a data distribution system.

To attain the above object, according to the present invention, there is provided a data distribution server comprised of a data distribution server, an access server for transferring intended data to users, and a network cache apparatus provided in the network and having a cache function unit for temporarily storing the data from the data distribution server and an exchange function unit for routing the stored data to the access server corresponding to a destination user.

By this, a data distribution system capable of suppressing a fall in the efficiency of operation of the network due to repeated data retransmission in the network when distributing a large volume of data from the data distribution server on the data supply side to the access server on the data receiver side via the network is realized.

BRIEF DESCRIPTION OF THE DRAWINGS

The above object and features of the present invention will be more apparent from the following description of the preferred embodiments given with reference to the accompanying drawings.

FIG. 7 is a third part of a view of a first example of data distribution processing in the data distribution system shown in FIG. 2 and FIG. 3;

FIG. 10 is a third part of a view of a second example of data distribution processing in the data distribution system shown in FIG. 2 and FIG. 3;

FIG. 21 is a view of a conventional general data distribution system.

DESCRIPTION OF THE PREFERRED EMBODIMENTS

Figure 1:
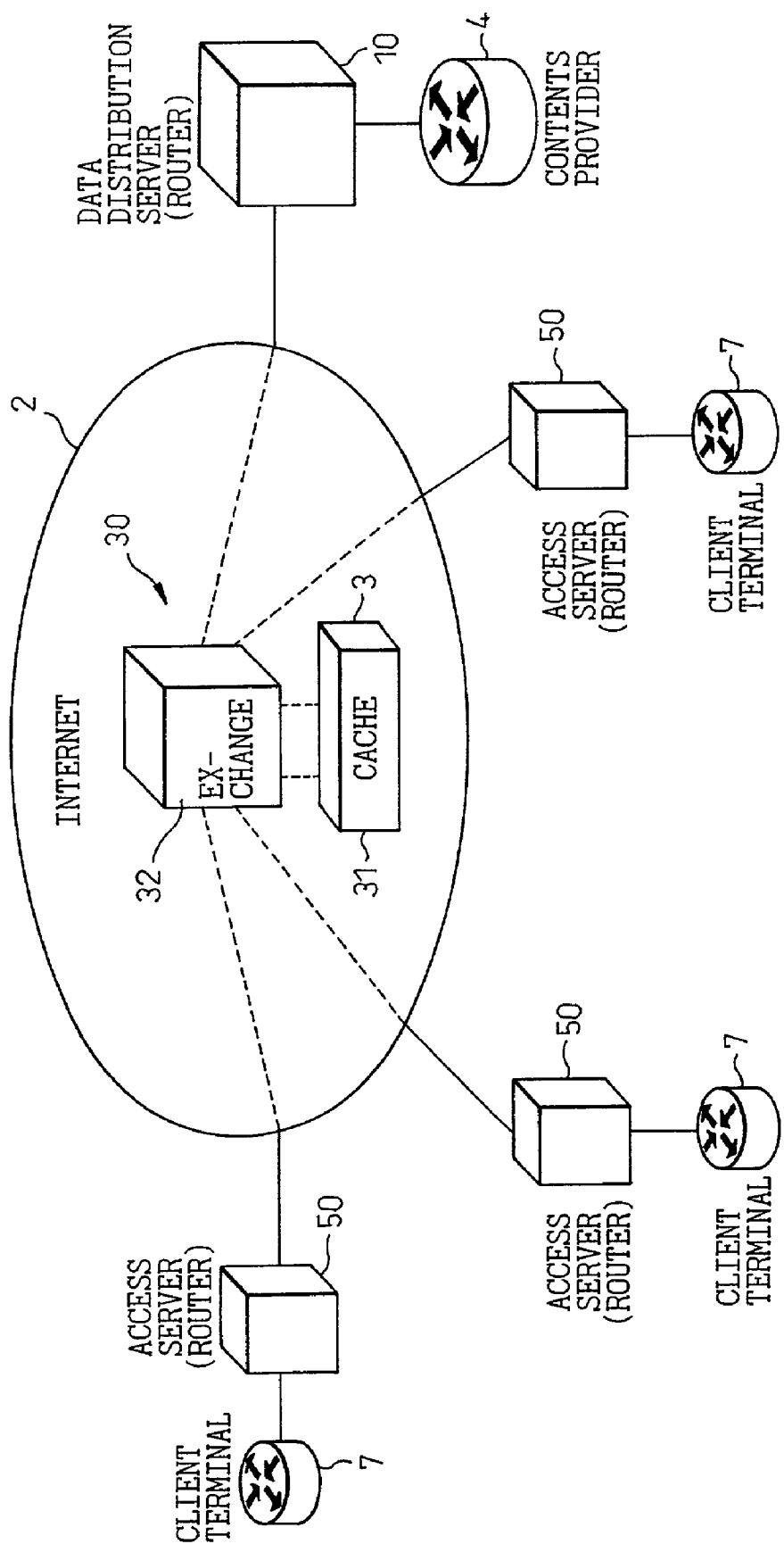
FIG. 1 is a view of the basic configuration of a data distribution system according to the present invention.

Before describing the embodiments of the present invention, the related art and the disadvantages therein will be described with reference to the related figures.

FIG. 21 is a view of a conventional general data distribution system.

In the figure, reference numeral 1 represents a data distribution system having a conventional configuration. The system 1 is comprised by a network 2 like the Internet and data provider side apparatuses and data receiver side apparatuses arranged on the outside thereof.

The data provider side apparatuses are mainly comprised by a content distribution server 5 for transmitting provided data (content) from a content provider 4 to the network 2. Also, the data receiver side apparatuses are mainly comprised by a cache server 6 for temporarily holding the transmitted content and a client apparatus 7 on the user side receiving the held content.

A plurality of client apparatuses (users) 7 exist corresponding to the users. A router 3 inside the network determines toward which client apparatus 7 each content is to be distributed based on a destination address written in a header of each content. The router 3 has a buffer 8 for momentarily holding each content for a time required for performing that distribution processing.

More concretely, when an access request of the intended data is issued from a certain user (7), the corresponding cache server 6 requests the content distribution server 5 transmit the related data via the network 2. When the cache server 6 receives the data transmitted from the content distribution server 5 according to this request, the server 6 caches that received data in itself for a certain constant time.

When assuming that an access request is generated again from the user (7) in a constant valid term, the corresponding cache server 6 directly transfers the cache data cached in itself as described above to that user (7). Here, the data transmitted from the distribution server 5 is transferred to the target cache server 6 while being sequentially relayed by a plurality of routers 3 in the network 2.

There are actually a plurality of routers 3 shown in FIG. 21 in the network 2. Data is transferred to the target cache server 6 while being sequentially relayed by these routers 3. In this case, collision of the data may occur at the incoming port or the outgoing port of each router 3. Also, collision of data may occur at the cache server 6 on the receiver side.

In order to avoid such collision of the data in advance, a buffer 8 is provided in each router 3, data is temporarily stored in this buffer 8, and data is read out from the buffer 8 at the optimum transmission timing of the data, that is, a timing where collision can be avoided.

However, a buffer 8 does not have a capacity (buffer amount) large enough to hold a large volume of data such as a movie and music for a long time. For this reason, data has to be discarded when a buffer 8 receives a large volume of data.

Then, as mentioned above, the related data is repeatedly retransmitted between the routers 3 and the distribution server 5 due to the discarding of the data. Such repeated retransmission of data wastes the resources of the network 2 and in the end results in the problem of a fall in the efficiency of operation of the network 2.

Accordingly, the present invention realizes a data distribution system capable eliminating waste of the network resources due to repeated retransmission of data and improving the efficiency of operation of the network.

Also, the present invention realizes a data distribution server, network cache apparatus, and access server compatible with such a data distribution system.

The present invention will be explained in detail below.

FIG. 1 is a view of the basic configuration of a data distribution system according to the present invention. Note that the same reference numerals or symbols are given to similar components throughout the drawings.

As shown in the figure, a data distribution system 1 according to the present invention is roughly comprised of a data distribution server 10 on the data provider side, a network cache apparatus 30 in the network 2, and at least one user side access server 50. Here, the data distribution server 10 provides data to the user side.

Each access server 50 is provided on the user side and transfers the intended data to each user.

The network cache apparatus 30 has a cache function unit 31 provided in the network 2 distributing data between the data distribution server 10 and the access server 50 and temporarily storing data from the data distribution server 10 and an exchange function unit 32 for routing the stored data to the access server 50 corresponding to the destination user.

The cache function unit 31 can temporarily store a large volume of data inside this.

Also, the exchange function unit 32 can route a large volume of data stored in the cache function unit 31 to each access server 50.

Thus, a large volume of data can be distributed to the target access server 50 while avoiding collision of data.

Figure 2:
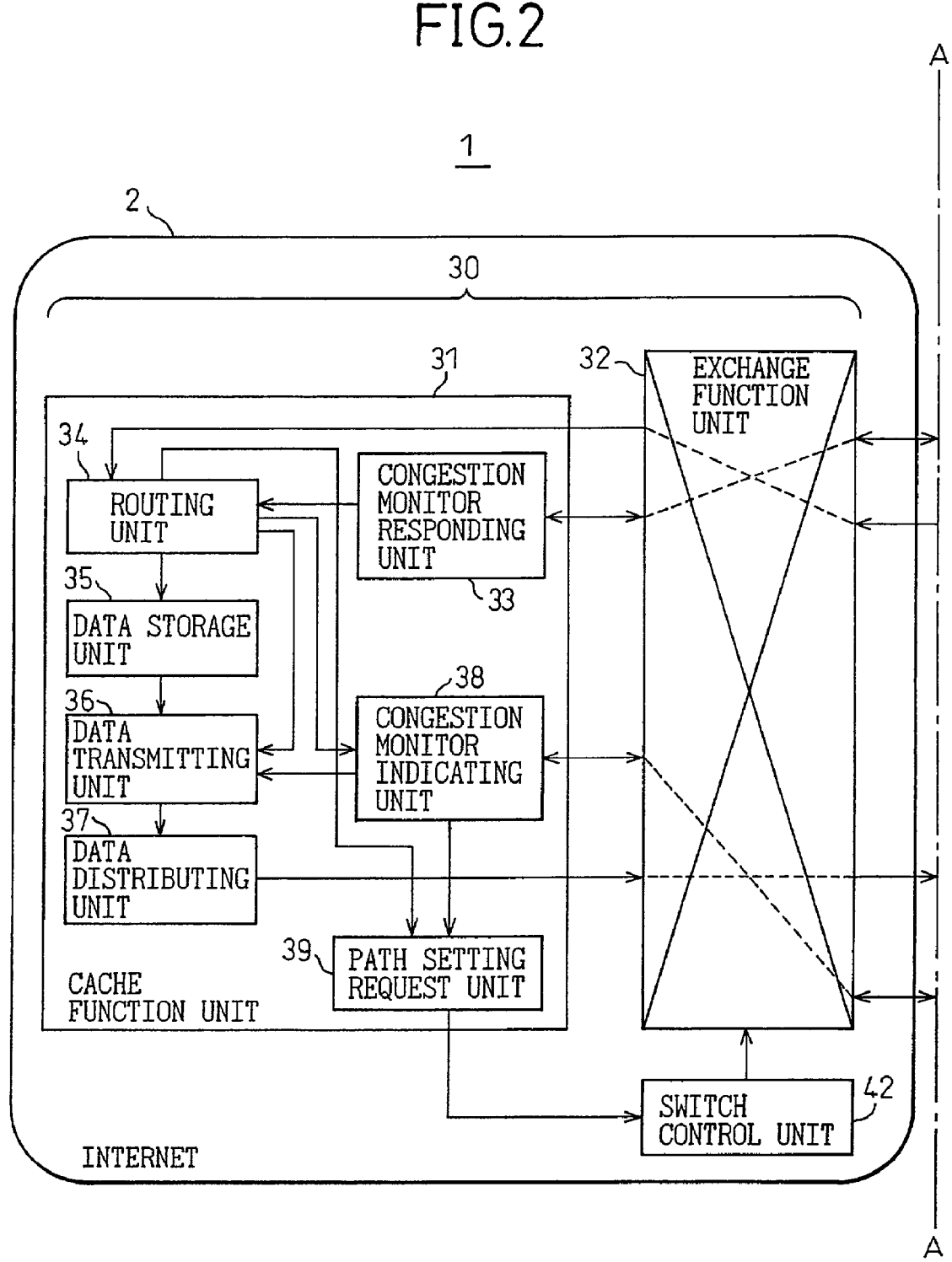
FIG. 2 is a view of a concrete example of a network cache apparatus according to the present invention.
Figure 3:
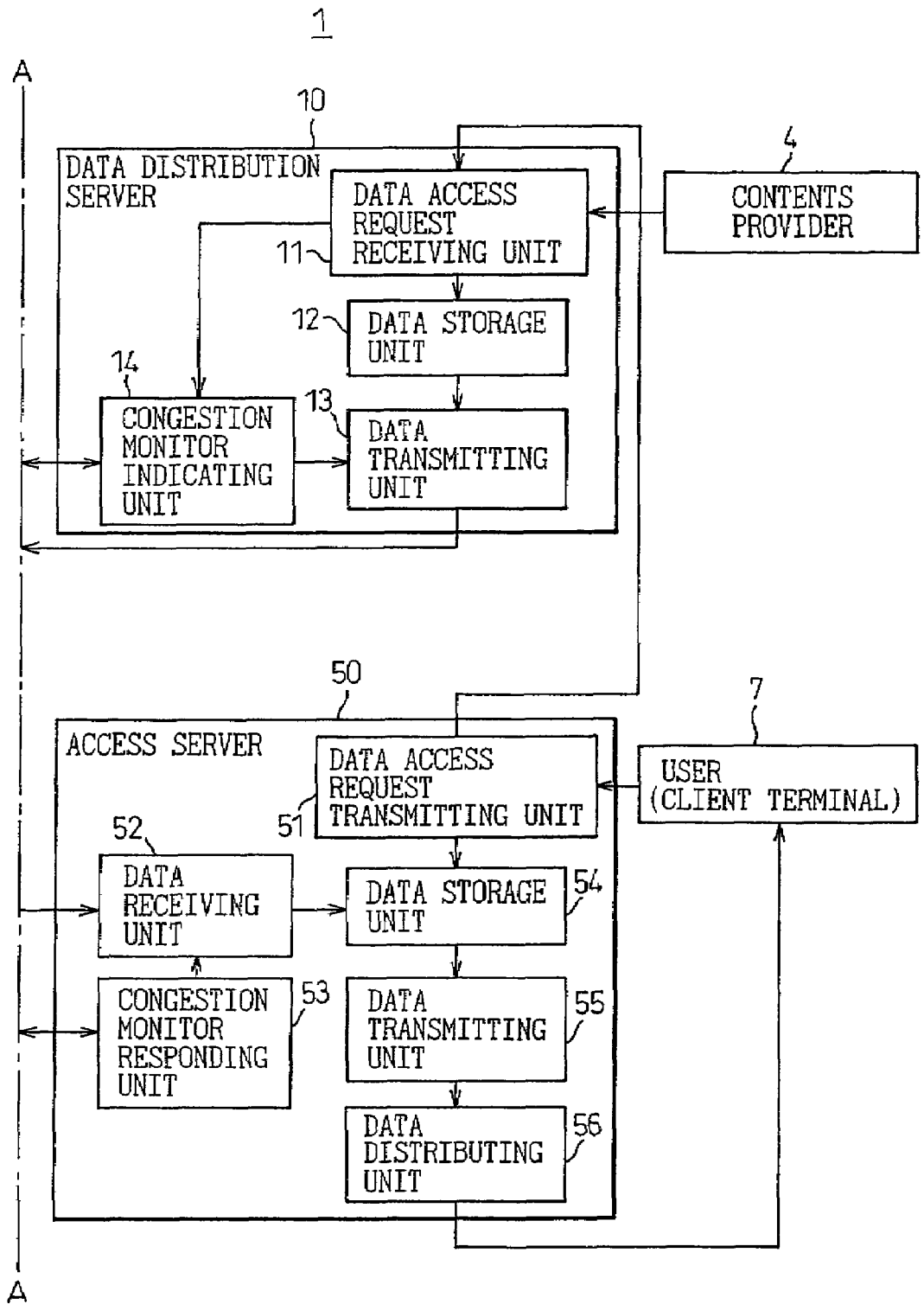
FIG. 3 is a view of a concrete example of a data distribution server and an access server according to the present invention.

FIG. 2 is a view of a concrete example of the network cache apparatus according to the present invention, and FIG. 3 is a view of a concrete example of the data distribution server and the access server according to the present invention.

Note that the data distribution system 1 according to the present invention is divided into two parts by the one-dot chain line A-A and shown as FIG. 2 and FIG. 3.

Referring to FIG. 2 and FIG. 3, first, the exchange function unit 32 shown in FIG. 2 is comprised of an optical cross-connect equipment or a label switch (ATM switch etc.) This is because it is optimum for the exchange of the large volume of data.

Thus, one of characteristic features of the present invention is that the optical cross-connect equipment or label switch (refer to FIG. 4 and FIG. 20) forming the exchange function unit 31 of the network cache apparatus 30 is connected between both the data distribution server 10 and network cache apparatus 30 and both the network cache apparatus 30 and access server 50.

Particularly, when an optical cross-connect equipment is employed, data is distributed to the access server 50 side by wavelength division multiplex (WDM) transmission. In actuality, multiplexing of light having wavelengths of about 100 is possible, and the high speed distribution of a large volume of data can be easily achieved.

Next, referring to both FIG. 2 and FIG. 3, the data distribution server 10 is provided with a congestion monitor indicating unit 14 for transmitting an inquiry request command to the network cache apparatus 30 to inquire about the congestion state thereof when data must be transmitted to the network cache apparatus 30.

On the other hand, the network cache apparatus 30 is provided with a congestion monitor responding unit 33 for receiving the inquiry request command, inquiring about the congestion state thereof, and returning the result to the congestion monitor indicating unit 14 as the inquiry response.

Here, the data distribution server 10 transmits data when the inquiry response indicates "no congestion".

Similarly, the network cache apparatus 30 is provided with a congestion monitor indicating unit 38 for transmitting an inquiry request command to the access server 50 to inquire about the congestion state thereof when data is received from the data distribution server 10 and data must be transmitted to the access server 50.

On the other hand, the access server 50 is provided with a congestion monitor responding unit 53 for receiving the inquiry request command, inquiring about the congestion state thereof, and returning the result as the inquiry response to the congestion monitor indicating unit 38.

Here, the network cache apparatus 30 transmits the data when the inquiry response indicates "no congestion".

When viewing just the data distribution server 10 by referring to the top part of FIG. 3, the server 10 is the data distribution server placed outside of the network 2. This server 10 receives data from the outside, temporarily holds this, communicates with the network cache apparatus 30 provided in the network 2 for routing that held data to the user side, and distributes the data to the user (7) outside the network 2.

Also, as will be concretely explained by referring to FIG. 7, FIG. 10, etc., the data distribution server 10 has a data transmitting unit 13.

This data transmitting unit 13 generates a packet for transmitting the data and then adds a cache specifying address for specifying the network cache apparatus 30 as the destination of transmission to this packet. When there are a plurality of network cache apparatuses 30 in the network 2, it adds a cache-specifying multi-cast address for specifying these network cache apparatuses 30 as the destinations of transmission to that packet.

That data transmitting unit 13 cooperates with a data access request receiving unit 11 for accepting a send request of the data from the data provider (4) or the access request of data from the user 7 and outputs information concerning at least a destination list of the destinations of distribution of the data and a valid term of the distribution together with the related data from the data access request receiving unit 11.

Also, as shown in FIG. 3, the server 10 further has a data storage unit 12 for storing the data and information output from the data access request receiving unit 11 for a certain valid term. Then, it transmits the stored data and information from the data transmitting unit 13 to the network cache apparatus 30 according to a send instruction.

The server 10 further has the congestion monitor indicating unit 14 for outputting the send instruction. This congestion monitor indicating unit 14 transmits the inquiry request command to the network cache apparatus 30 to inquire about the congestion state thereof when the data and information are to be transmitted to the network cache apparatus 30.

Next, looking at the network cache apparatus 30 by referring to FIG. 2, as mentioned above, the apparatus 30 is provided with the cache function unit 31 linked with both the data distribution server 10 for supplying data to the user side and at least one access server 50 provided on the user side for transferring the intended data to users and then temporarily storing the data from the data distribution server 10, and the exchange function unit 32 for routing the stored data to the access server 50 corresponding to the destination user.

The former cache function unit 31 has the congestion monitor responding unit 33 for performing the inquiry in response to the inquiry request of the congestion state from the data distribution server 10 and returning the result to this data distribution server 10.

That cache function unit 31 has a routing unit 34 for receiving the data and the information concerning at least the distribution destination list of the data and the distribution valid term thereof from the data distribution server 10 (refer to FIG. 5) and controlling a distribution of the data to the access server 50 corresponding to the user (7) as the destination of the distribution via the exchange function unit 32 and a data storage unit 35 for storing the data from this routing unit 34 for a certain valid term.

The former routing unit 34 creates a routing table listing the group of addresses of the distribution destinations based on the above information and specifies the user (7) as the destination of the distribution according to this routing table (FIG. 7).

The cache function unit 31 has the congestion monitor indicating unit 38. This congestion monitor indicating unit 38 transmits an inquiry request command to the access server 50 when data is to be transmitted to the access server 50 and confirms whether or not the inquiry response indicates "no congestion".

Also, the cache function unit 31 has the data transmitting unit 36. This data transmitting unit 36 transfers the data stored in the data storage unit 35 toward the exchange function unit 32 when the inquiry response indicates "no congestion".

When transferring data toward the exchange function unit 32, the routing unit 34 creates a routing table listing the group of addresses of the distribution destinations based on the above information and specifies the user (7) as the distribution destination according to this routing table (refer to FIG. 7).

Here, the cache function unit 31 has a data distributing unit 37. This data distributing unit 37 transfers the data from the data transmitting unit 36 to the exchange function unit 32 toward the user (7) as the destination of distribution specified according to the routing table.

In order to transfer data to the exchange function unit 32, the cache function unit 31 has a path setting request unit 39. This path setting request unit 39 performs the route setting toward the user (7) of the destination of distribution specified according to the routing table for the exchange function unit 32 via a switch control unit 42.

The path setting request unit 39 selectively performs the above route setting for the access server for which the inquiry response indicates "no congestion" among a plurality of access servers 50 and prohibits the transfer of the data to be distributed to the access server from the data distributing unit 37 for the access server for which the inquiry response does not indicate "no congestion".

Finally, looking at each access server 50 by referring to the bottom part of FIG. 3, the server 50 is the access server placed outside the network 2. This server 50 communicates with the network cache apparatus 30 provided in the network 2 for receiving data from the outside and temporarily storing it and for routing that stored data to the user (7) side, fetches the data stored in this network cache apparatus 30, and distributes this to the user (7).

This access server 50 has a data access request transmitting unit 51. This transmitting unit 51 is linked to the data distribution server 10 placed outside of the network 2 and providing the data to be held by the network cache apparatus 30 and transmits this access request to the data distribution server 10 when there is an access request of the data from the user (7) with respect to this data distribution server 10.

The access server 50 has the congestion monitor responding unit 53 as already mentioned. This responding unit 53 performs the related inquiry in response to the inquiry request of the congestion state from the network cache apparatus 30 and returns the inquiry result to this network cache apparatus 30 as the inquiry response.

The access server 50 has a data receiving unit 52. This receiving unit 52 receives the data transmitted from the network cache apparatus 30 when the inquiry response is "no congestion".

The access server 50 is also provided with a data storage unit 54 for storing the data received at the data receiving unit 52 for a certain valid term as mentioned above, a data transmitting unit 55 for transferring the stored data toward the user side based on a send instruction from the data access request transmitting unit 51, and a data distributing unit 56 for distributing that transferred data to each corresponding user (7).

When summarizing the points of the operation and effects of the data distribution system 1 according to the present invention explained by referring to FIG. 1 to FIG. 3, they become as follows.

The present invention places the network cache apparatus 30 provided with a label switch or an optical cross-connect equipment (32) and giving a large capacity buffer (31) inside the network (2). The data distribution server 10 observes a load (congestion) state of the network cache apparatus 30 when receiving multi-media data or receiving an access request from the user (7) and distributes the data when the network cache apparatus 30 enters into a data receivable state. Here, the network cache apparatus 30 caches the data for the valid term based on the distribution valid term transferred from the data distribution server 10 simultaneously with the data.

Also, the network cache apparatus 30 observes the load (congestion) state of the access server 50 when receiving a large volume of data from the data distribution server 10 and sends the data when the access server 50 enters into a data receivable state.

In this way, repeated unnecessary retransmission of data on the network 2 is avoided, whereby the throughput of the network 2 is raised.

Also, by imparting a distribution function to the network cache apparatus 30, unnecessary multi-cast at the data distribution server 10 is prevented, whereby the load of the data distribution server 10 is reduced.

More concretely, as shown in FIG. 2 and FIG. 3, the data distribution server 10 stores data in the data storage unit 12 for a certain period and, when receiving the data, issues an instruction to the network cache apparatus 30 so as to observe the state of the load (congestion) from the congestion monitor indicating unit 14. Thus, when the load of the network cache apparatus 30 is small, the data is transmitted from the server 10. Thus, unnecessary data retransmission processing at the data distribution server 10 can be prevented.

When the network cache apparatus 30 is instructed to monitor the congestion state thereof from the data distribution server 10, the congestion monitor responding unit 33 returns a response indicating that the load (congestion) is small to the server 10 and requests the reception of the data to the data distribution server 10. Here, the data is received at the apparatus 30. By this, the discarding of data in the network cache apparatus 30 can be prevented.

Also, in order to observe the load (congestion) state of the access server 50, the congestion monitor indicating unit 38 issues an instruction to the access server 50 so as to observe that load (congestion) state. By this, the related data is transmitted by selecting the time when the load (congestion) of the access server 50 is small. Thus, unnecessary data retransmission processing at the network cache apparatus 30 can be prevented.

Also, the data distributing unit 37 distributes the data to a plurality of access servers 50 and, at the same time, the path setting request unit 39 outputs the setting request of a plurality of routes to be set to the exchange function unit 32 (label switch or optical crossconnect equipment). By this, the multi-cast processing by the data distribution server 10 is made unnecessary. An example of the exchange function unit 32 (label switch or optical cross-connect equipment) receiving the setting request is shown in FIG. 4.

Figure 4:
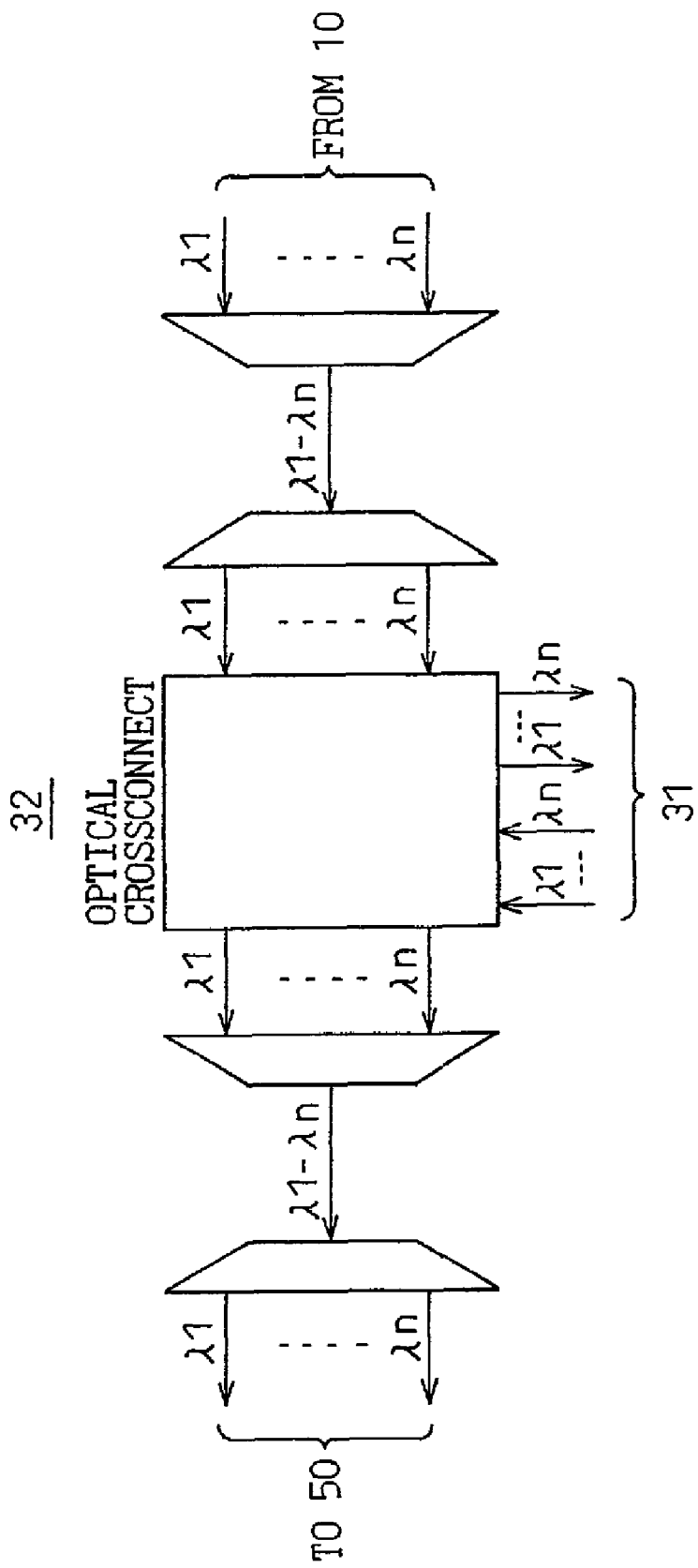
FIG. 4 is a view of an example of an exchange function unit 32.

FIG. 4 is a view of an example of the exchange function unit 32.

Either of the label switch or the optical cross-connect equipment can be used as the exchange function unit 32, but when a large volume of data like a movie is handled, an optical cross-connect equipment is more preferred. FIG. 4 assumes the case of this optical cross-connect equipment and describes various types of wavelengths λ1 to λn for the wavelength multiplex transmission of data. Note that the basic configuration of the equipment substantially has the configuration of the present figure also in the case where a label switch is assumed.

What should be noted here is that, of the cache function unit 31 and the exchange function unit 32 by which the network cache apparatus 30 of FIG. 1 is constituted. The exchange function unit 32 shown in FIG. 4 as one example may be one already existing in the network 2. For example, if an optical cross-connect equipment has been already employed in the network 2, this already employed optical cross-connect equipment may be used to realize the exchange function unit 32 of the network cache apparatus 30. Namely, it is not necessary to newly provide the exchange function unit 32 in such a case.

Figure 20:
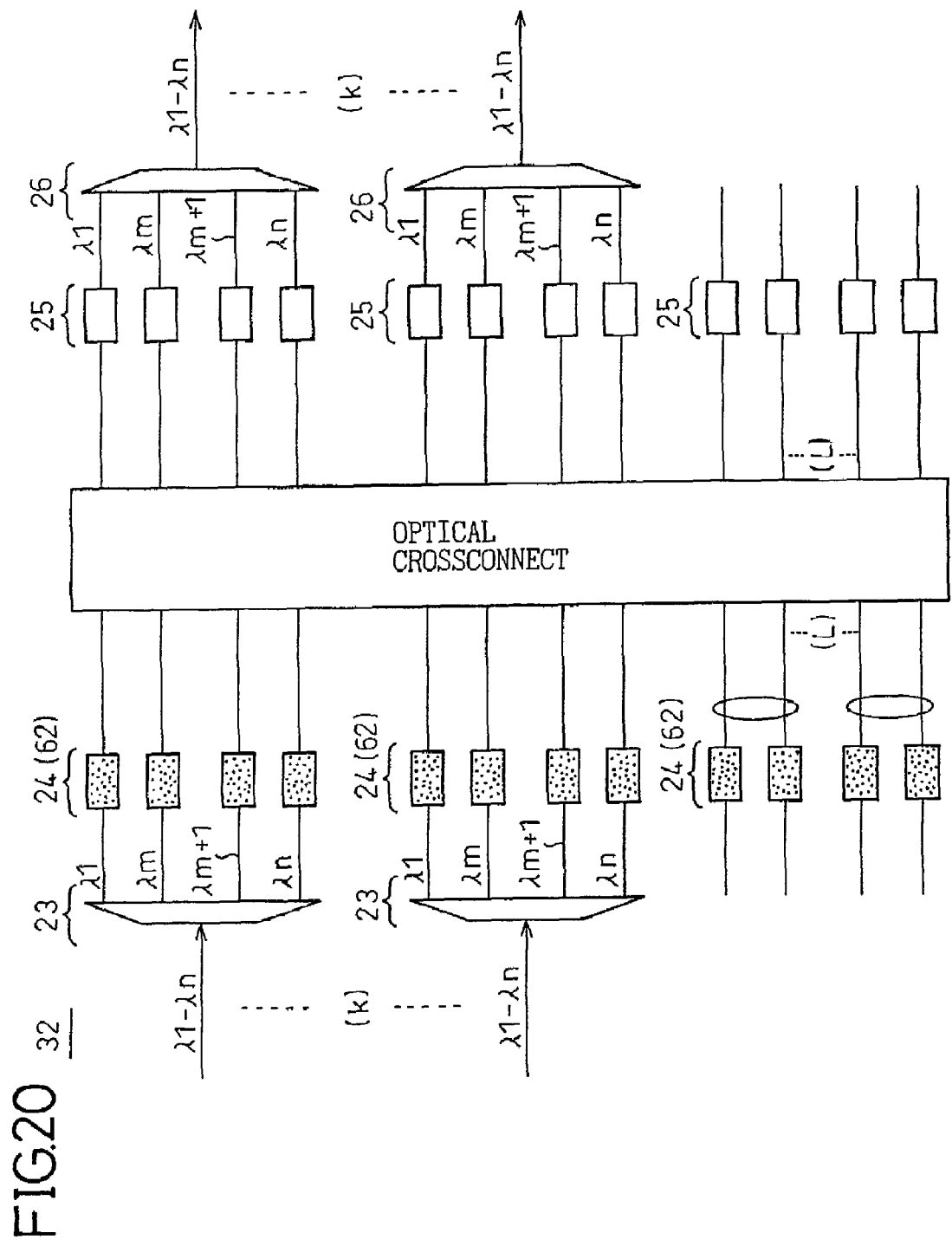
FIG. 20 is a view of an example of realization of a failure monitor means 62 of FIG. 19.

Referring to FIG. 4, the optical cross-connect equipment forming the exchange function unit 32 is comprised by an wavelength de-multiplexer/wavelength multiplexer and optical cross-connect for routing the wavelength multiplexed data from the data distribution server 10 to the access server 50 as the wavelength multiplexed data while fetching it into the cache function unit 31 (refer to FIG. 20). By this, a large volume of data can be transferred by one optical fiber.

Figure 5:
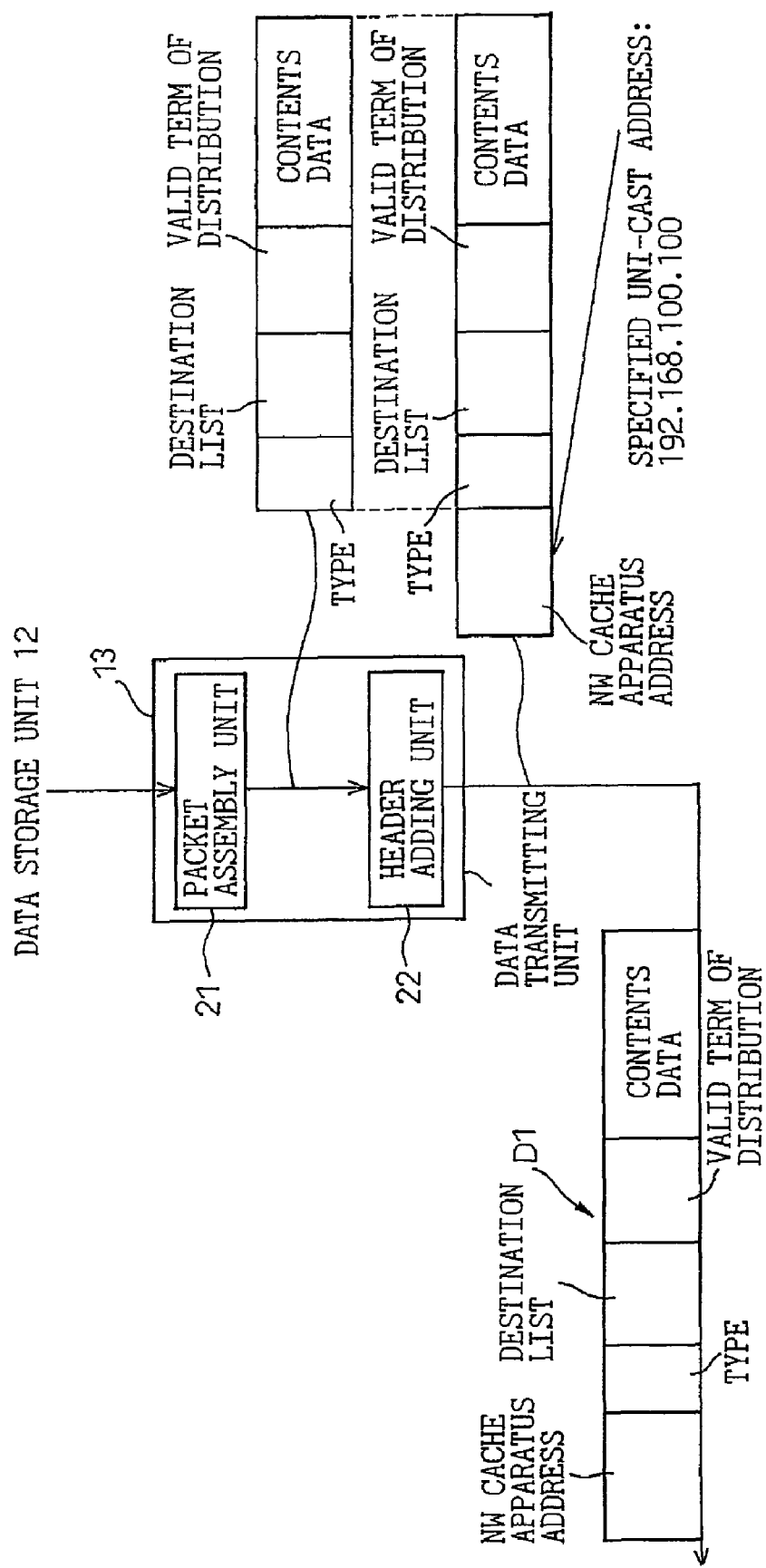
FIG. 5 is a first part of a view of a first example of data distribution processing in the data distribution system shown in FIG. 2 and FIG. 3.
Figure 6:
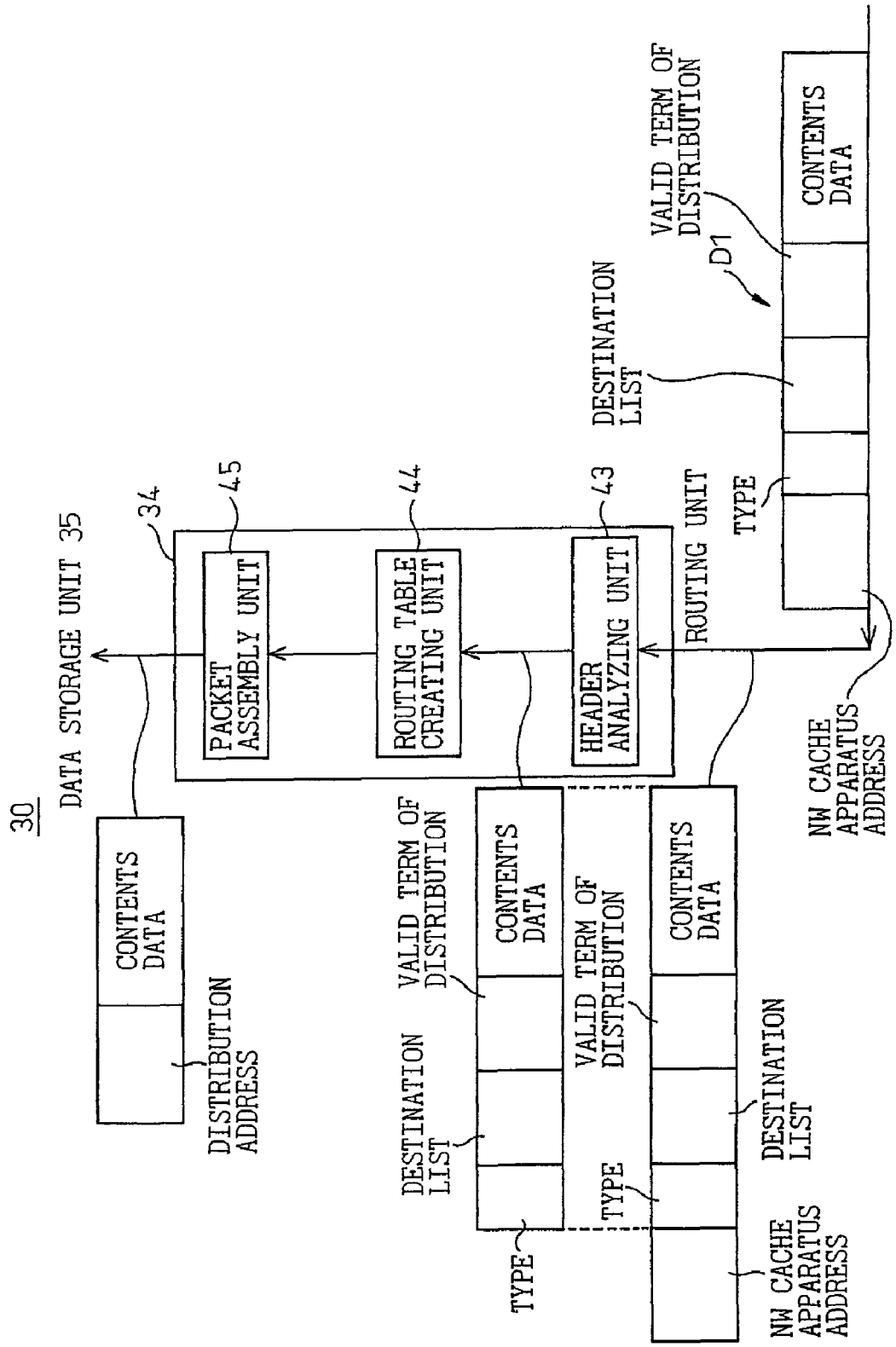
FIG. 6 is a second part of a view of a first example of data distribution processing in the data distribution system shown in FIG. 2 and FIG. 3.

FIG. 5 to FIG. 7 are parts of a view of a first example of data distribution processing in the data distribution system shown in FIG. 2 and FIG. 3.

Particularly, FIG. 5 shows the data distribution processing at the data distribution server 10, FIG. 6 shows the data distribution processing at the network cache apparatus 30, and FIG. 7 shows the routing table for the access server distribution generated in FIG. 6.

In the data distribution processing represented in FIG. 5 to FIG. 7, where there is only one network cache apparatus 30 in the network 2 (refer to FIG. 1), the data distribution server 10 is provided with a data transmitting unit 13 for generating a packet for transmitting the data and then adding a cache specifying address (FIG. 7) for specifying the network cache apparatus 30 as the destination of transmission to the packet. Also, the network cache apparatus 30 is provided with the routing unit 34 for adding the distribution address for setting the access server 50 to which the packet is to be distributed from the destination information contained in the packet to the packet when detecting the cache specifying address directed to itself and transmitting this to the access server side and thereby performs the distribution of the data D1.

Referring to FIG. 5 to FIG. 7, the data transmitting unit 13 of the data distribution server 10 is comprised by a packet assembly unit 21 and a header adding unit 22.

The packet assembly unit 21 forms the information necessary for the transfer such as the type of the data, destination list, and the distribution valid term as the packet together with the data (contents data). The header adding unit 22 adds a specific IP address directed to the network cache apparatus 30 ("NW cache apparatus address" in the figure) to that packet and then transfers this (D1) to the apparatus 30 side.

By this, multi-cast processing at the data distribution server 10 is made unnecessary.

On the other hand, at the routing unit 34 of the network cache apparatus 30 shown in FIG. 6, the header of the received data (D1) is analyzed at a header analyzing unit 43. If this data packet is a packet having an IP address directed to the network cache apparatus 30, an access server distribution routing table for the multi-cast to the access server 50 to which the data must be transferred is created by the destination list contained in this packet. FIG. 7 shows an example of this table (note that, AC is an abbreviation of access).

Also, the packet assembly unit 45 adds the multi-cast IP address (distribution addresses) for the access server distribution to the data (content data) by referring to the table of FIG. 7, then transfers this data to the data storage unit 35. By this, the access server to which the data must be transferred can be selected.

Figure 8:
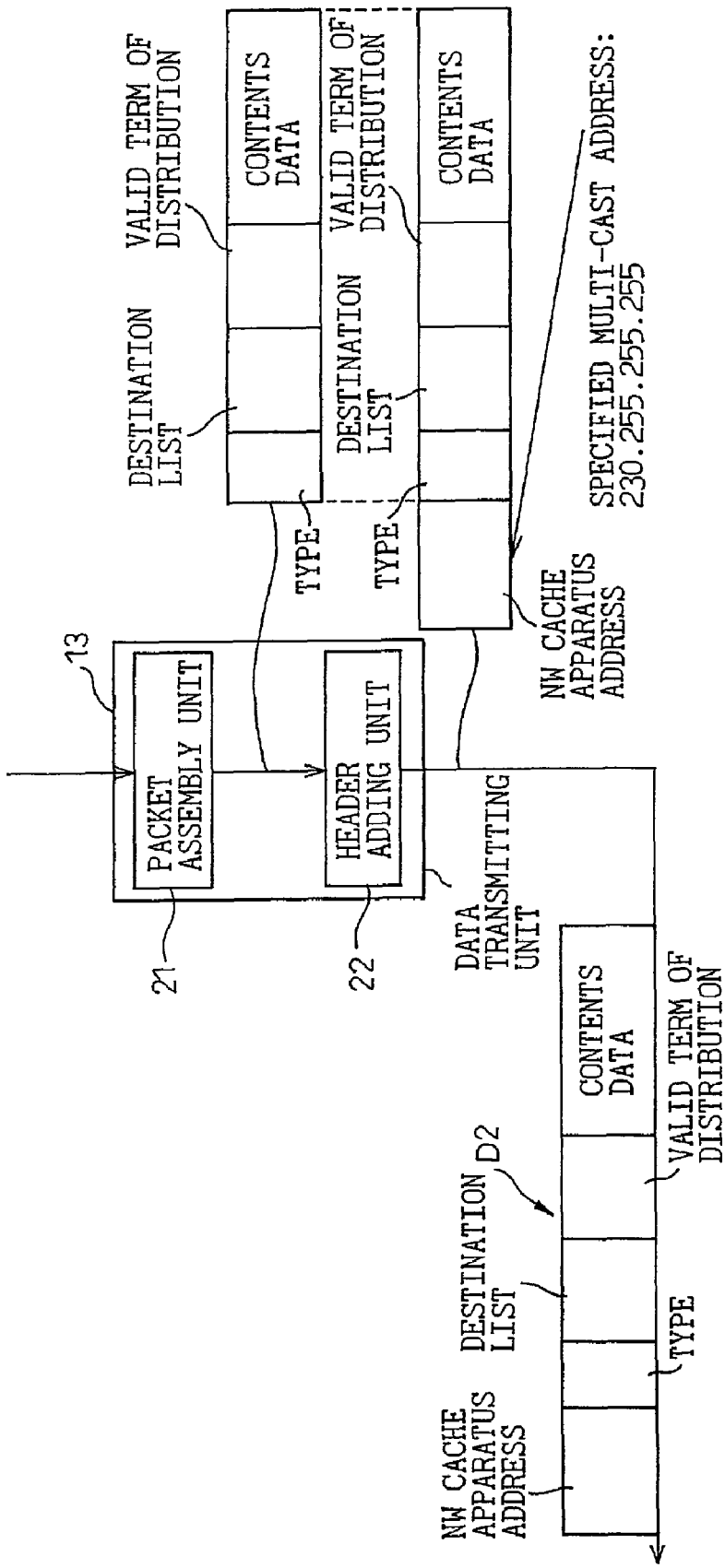
FIG. 8 is a first part of a view of a second example of data distribution processing in the data distribution system shown in FIG. 2 and FIG. 3.
Figure 9:
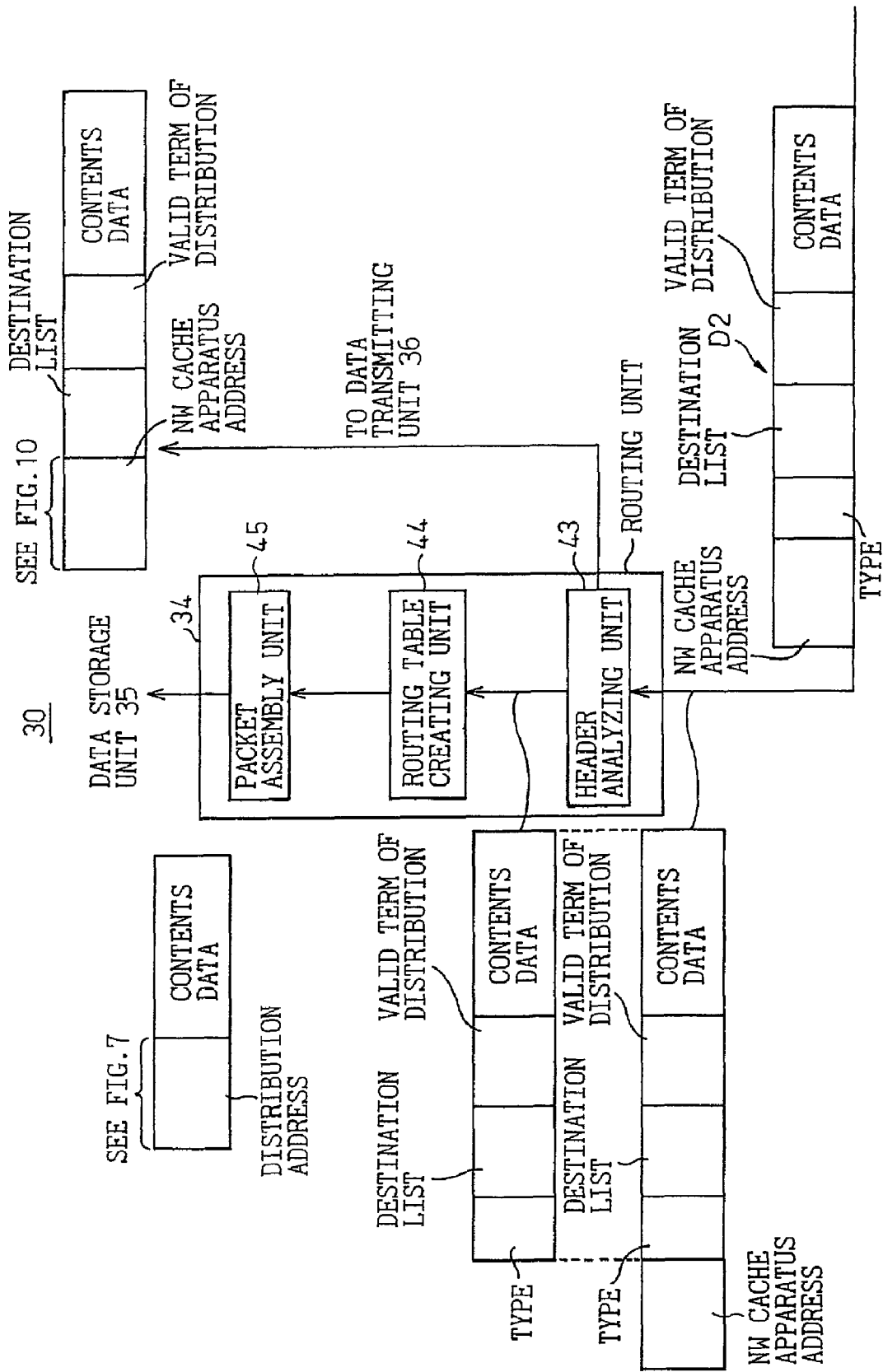
FIG. 9 is a second part of a view of a second example of data distribution processing in the data distribution system shown in FIG. 2 and FIG. 3.

FIG. 8 to FIG. 10 are views of a second example of the data distribution processing in the data distribution system shown in FIG. 2 and FIG. 3.

Figure 19:
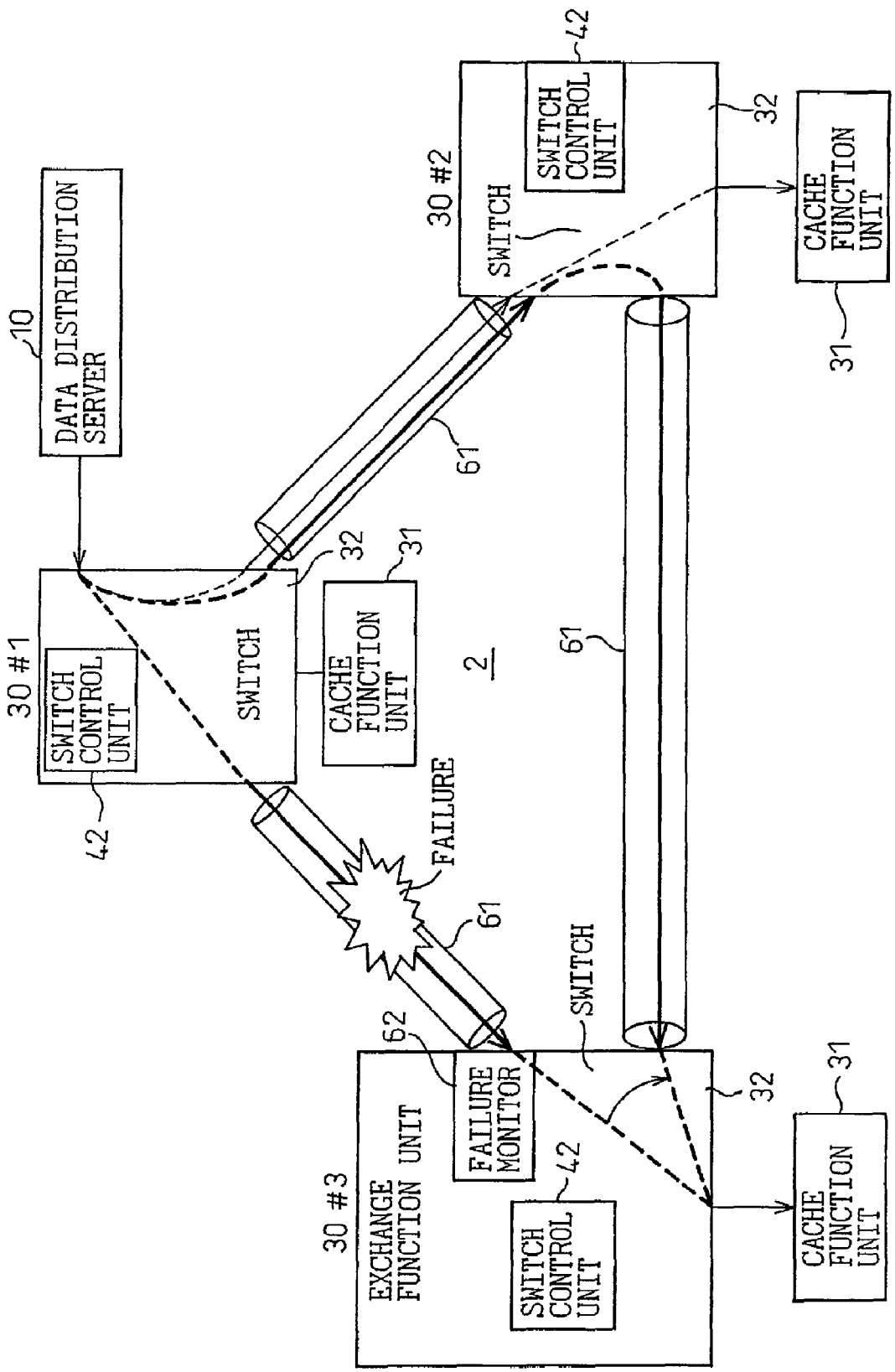
FIG. 19 is a view of an increase of reliability of the system by a bypass configuration mode.

FIG. 8 to FIG. 10 correspond to FIG. 5 to FIG. 7 mentioned above, but differ from FIG. 5 to FIG. 7 (there is only one apparatus 30) in the point that there are a plurality of network cache apparatuses 30 inside the network 2. As an example of the case where there are a plurality of apparatuses 30, there is a case as shown in FIG. 19.

In the data distribution processing represented in FIG. 8 to FIG. 10, when there are a plurality of network cache apparatuses 30 inside the network 2, the data distribution server 10 is provided with the data transmitting unit 13 for generating a packet for transmitting the data, then adding the cache-specifying multi-cast address (FIG. 10) for specifying a plurality of network cache apparatuses 30 as the destination of transmission to the packet. Also, each network cache apparatus 30 further distributes the packet to the network cache apparatus of the next stage based on the cache specifying multi-address when detecting a cache-specifying multi-address containing the address of itself and, at the same time, each network cache apparatus is provided with the routing unit 34 for adding the distribution address (FIG. 7) for setting the access server to which the related packet is to be distributed from the destination information contained in the packet to the packet and transmitting this to the access server side and thereby performs the distribution of the data D2.

Referring to FIG. 8 to FIG. 9, the data transmitting unit 13 of the data distribution server 10 is comprised of the packet assembly unit 21 and the header adding unit 22 similar to FIG. 5, while the packet assembly unit 21 forms the information necessary for the transfer such as the type of the data, destination list, and the distribution valid term as the packet together with the data (contents data). The header adding unit 22 adds the specific multi-cast IP address directed to the network cache apparatus 30 to that packet and transfers this. By this, the multi-cast processing at the data distribution server is made unnecessary.

On the other hand, where there are a plurality of network cache apparatuses 30, the routing unit 34 of the network cache apparatus 30 shown in FIG. 9 analyzes the header of the received data at the header analyzing unit 43 and, if it is a packet having an IP address directed to the network cache apparatus 30, transfers the data to the network cache apparatus 30 to which the data is to be transferred next based on the network cache apparatus distribution routing table shown in FIG. 10 prepared in advance. For this purpose, that packet is copied, and that copied packet is sent to the data transmitting unit 36. Also, the routing unit 34 creates the distribution routing table (FIG. 7) for the multicast to the access server 50 to which the data is to be transferred by the destination list contained in the packet.

The packet assembly unit 45 adds the multi-cast IP address (distribution use address) for the access server distribution to the data and transfers this to the data storage unit 35.

By specifying the network cache apparatus of the next stage by such a network cache apparatus distribution routing table (FIG. 10), unnecessary multicasts can be reduced.

Next, an example of operation of the congestion monitor indicating units (14, 38) and the congestion monitor responding units (33, 53) explained in FIG. 2 and FIG. 3 will be shown.

Figure 11:
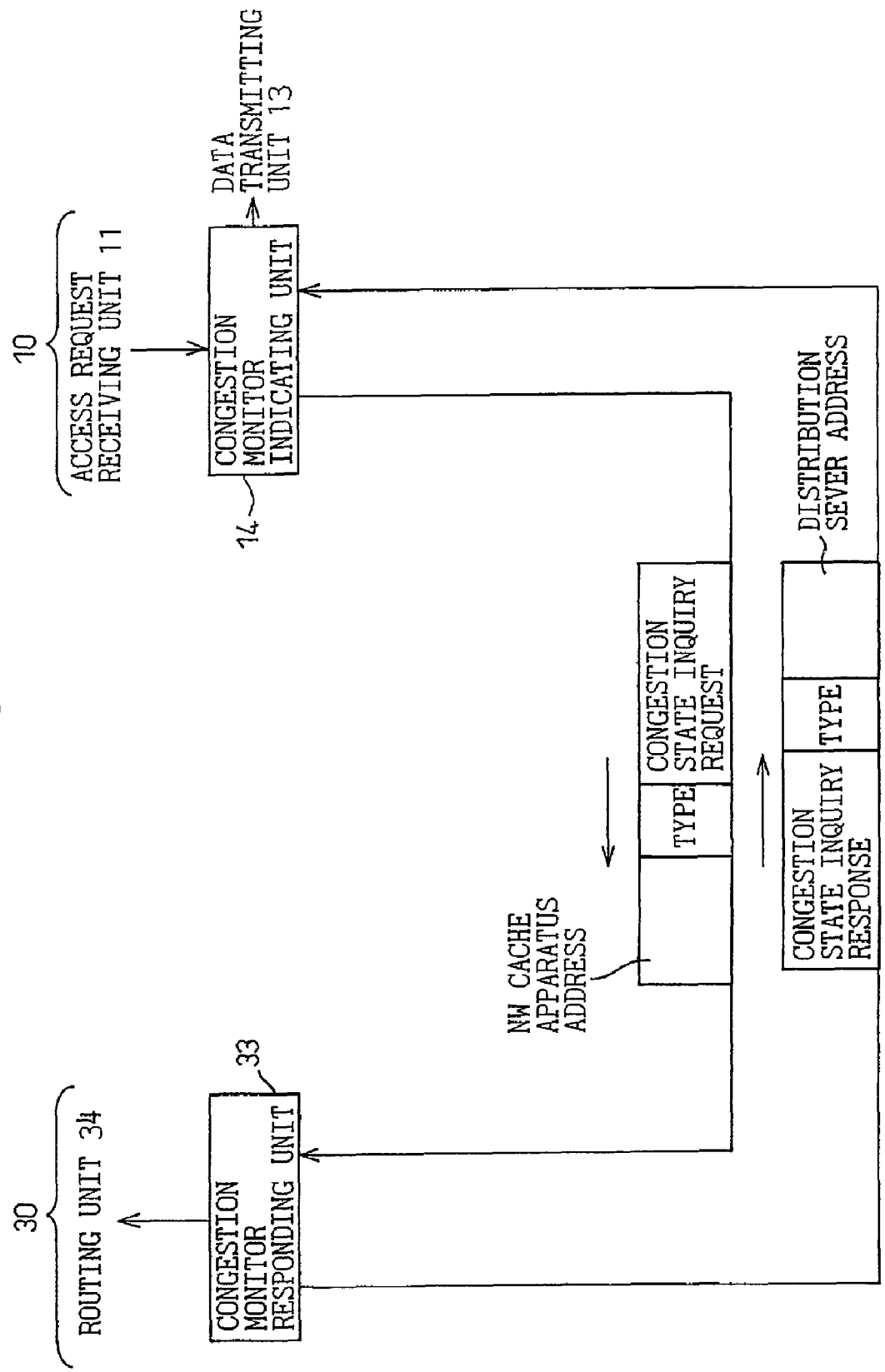
FIG. 11 is a view of a congestion monitor operation between a network cache apparatus 30 and a data distribution server 10.

FIG. 11 is a view of the congestion monitor operation between the network cache apparatus 30 and the data distribution server 10.

In the present figure, the congestion monitor indicating unit 14 on the data distribution server 10 side is placed on the right side, and the congestion monitor responding unit 33 of the network cache apparatus 30 side is shown on the left side. An illustrated "inquiry request of congestion state" is transmitted from the former indicating unit 14, while the latter responding unit 33 receiving this returns the result of inquiry in cooperation with a CPU (not illustrated) built in the apparatus 30 as a "response of congestion state inquiry" to the indicating unit 14 of the access server.

More concretely, when receiving the data from the data provider (4) or when there is an access request from the user (7), the data distribution server 10 adds the IP address ("NW cache apparatus address") of the network cache apparatus 30 to the packet of the congestion state inquiry request from the congestion monitor indicating unit 14 and transfers the packet to the network cache apparatus 30.

The network cache apparatus 30 inquires about the load of the CPU or the congestion state etc. of the reception buffer in the routing unit 34 and responds with the present congestion state to the server 10. If the network cache apparatus 30 is not in a congested state, the data distribution server 10 transmits the data based on the response result. By this, the discarding of the data at the network cache apparatus 30 can be eliminated.

Figure 12:
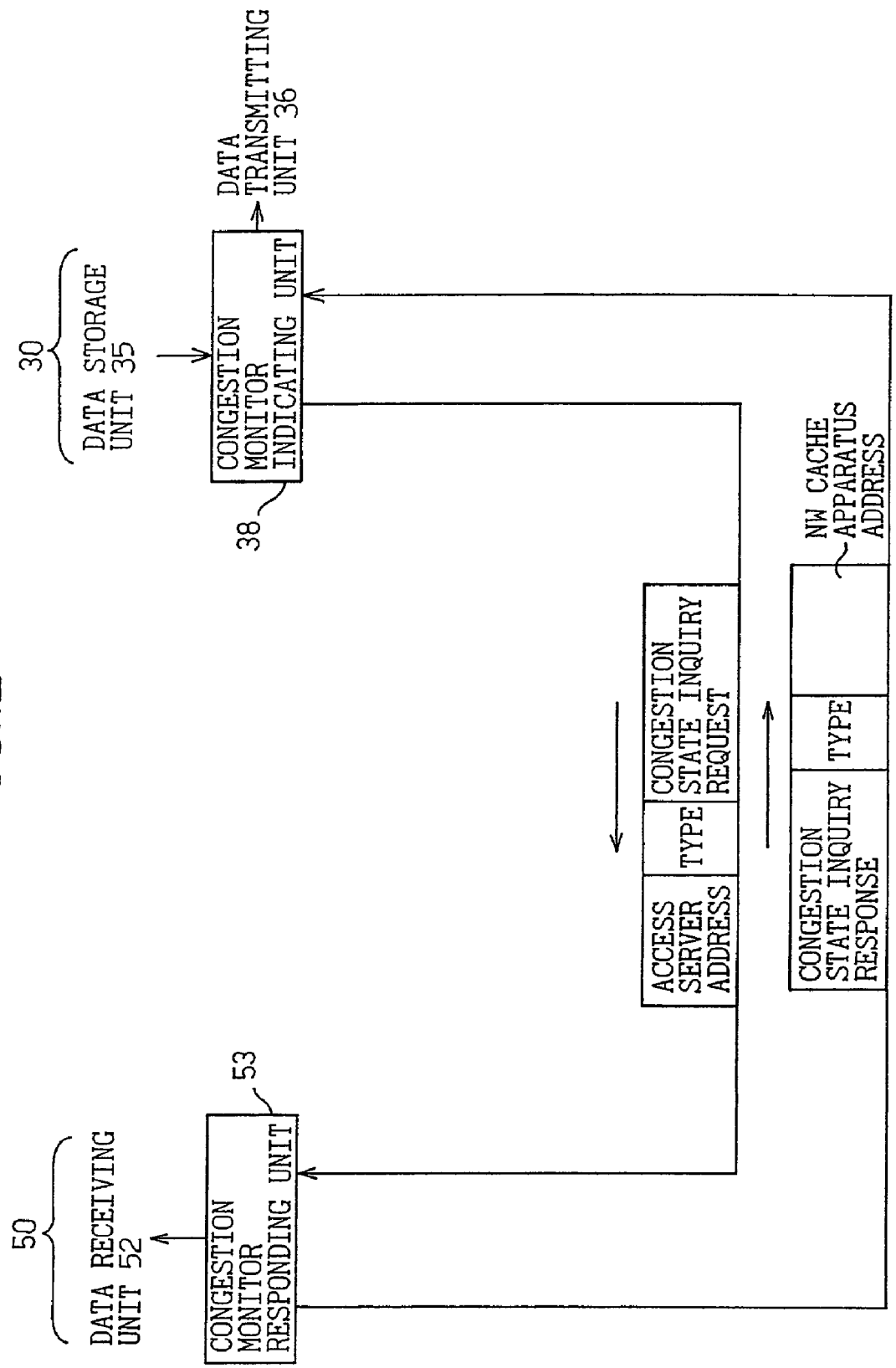
FIG. 12 is a view of a congestion monitor operation between the network cache apparatus 30 and an access server 50.

FIG. 12 is a view of a congestion monitor operation between the network cache apparatus 30 and the access server 50.

In the figure, the congestion monitor indicating unit 38 on the network cache apparatuses 30 side is shown on the right side, and the congestion monitor responding unit 53 on the access server 50 side is shown on the left side. The illustrated "request of congestion state inquiry" is transmitted from the former indicating unit 38, while the latter responding unit 53 receiving this returns the result of inquiry in cooperation with the CPU (not illustrated) built in the server 50 to the indicating unit 38 of the network cache apparatuses 30 as the "congestion state inquiry response".

More concretely, when receiving the data from the data distribution server 10, the network cache apparatus 30 transfers the packet of the request of the congestion state inquiry from the congestion monitor indicating unit 38 to the access server 50 after adding the IP address ("AC server address") of the access server 50 thereto.

The access server 50 inquires about the load of the CPU or the congestion state etc. of the reception buffer in the data receiving unit 52 and responds with the present congestion state to the indicating unit 38. If the access server 50 is not in a congested state, the network cache apparatus 30 transmits the data based on the response result. By this, the discarding of data at the access server 50 can be eliminated.

Figure 13:
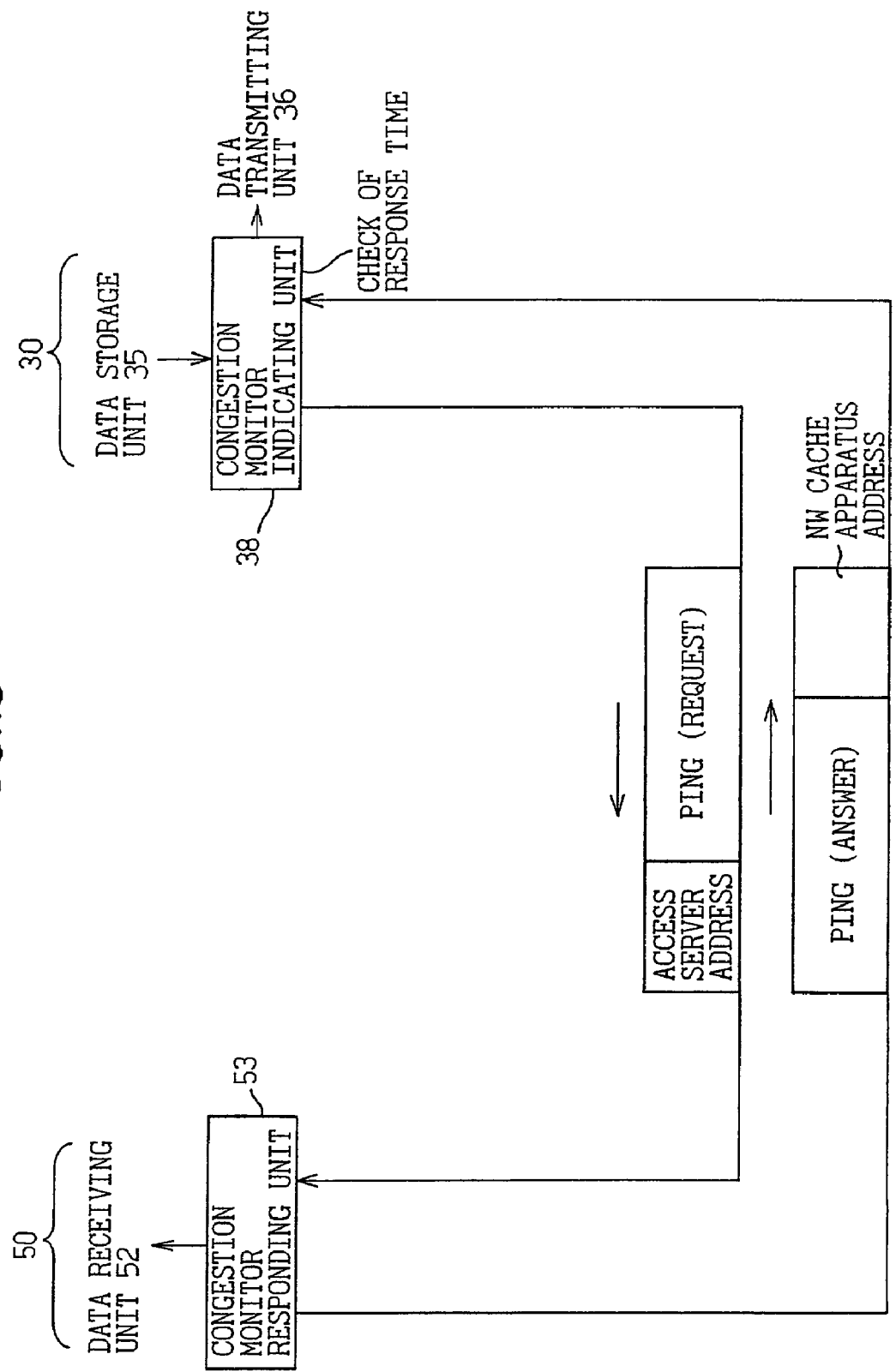
FIG. 13 is a view of a concrete example of the configuration of FIG. 12.

FIG. 13 is a view of a concrete example of the configuration of FIG. 12.

Note that the concrete example of the configuration of FIG. 11 is quite similar to FIG. 13.

According to what is shown in FIG. 13, the congestion is monitored by using a "Ping". Namely, the "congestion state inquiry request" of FIG. 12 is executed by a "Ping (request)", while the "congestion state inquiry response" is executed by a "Ping (Answer)".

Note that a "Ping" is well known as a program for diagnosing a TCP/IP network such as the Internet or intranet. By transmitting the data for inquiry (32 bytes) to the other party and checking the response time thereof, the congestion state of the other party can be determined.

Next, a concrete explanation will be given of the distribution processing of the data inside the network cache apparatus 30 shown in FIG. 2.

Figure 14:
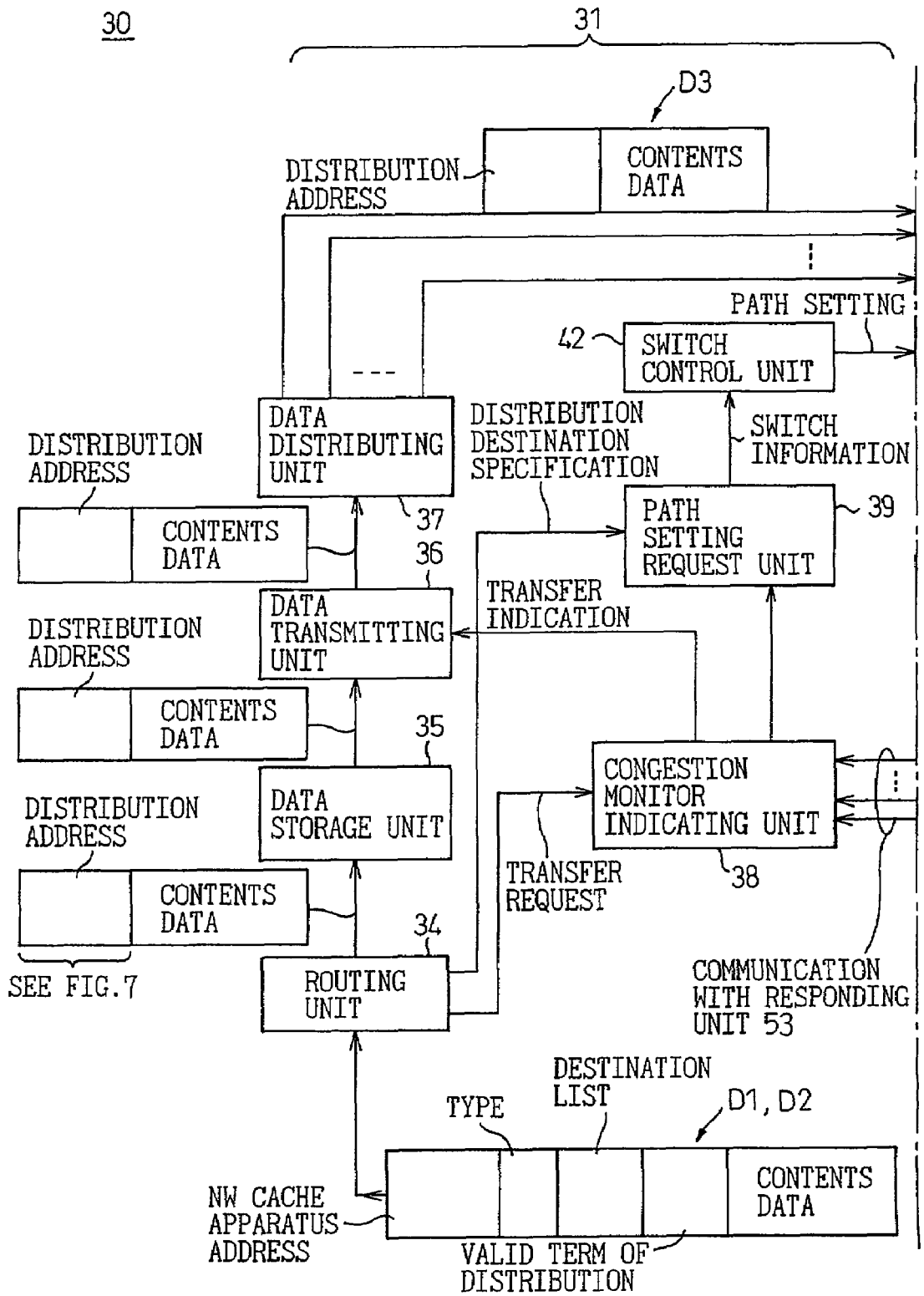
FIG. 14 is a first part of a view for explaining distribution processing of data at the network cache apparatus 30.
Figure 15:
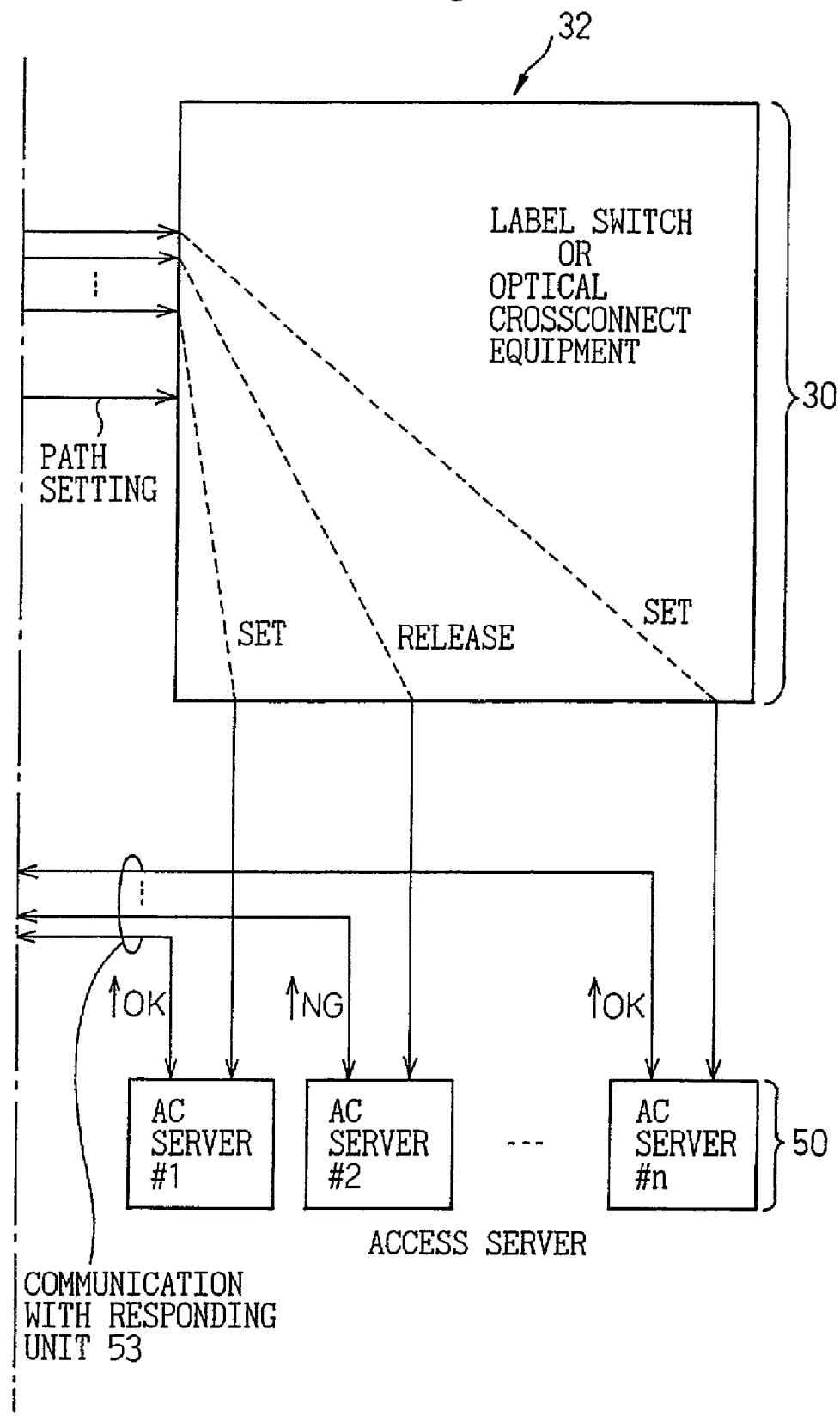
FIG. 15 is a second part of a view for explaining distribution processing of data at the network cache apparatus 30.

FIG. 14 and FIG. 15 are views for explaining the distribution processing of the data at the network cache apparatus 30.

FIG. 14 mainly shows the distribution processing at the cache function unit 31 in the network cache apparatus 30, the top part of FIG. 15 mainly shows the distribution processing at the exchange function unit 32 in the cache apparatus 30, and the bottom part of FIG. 15 mainly shows the distribution processing on the access server 50 side.

Referring to FIG. 14 and FIG. 15, when receiving the data (D1, D2) from the data distribution server 10, the network cache apparatus 30 defines the multi-cast IP address for the access servers 50 (#1, #2, . . . , #n) to which that data must be distributed from the destination list contained in that received data and creates the routing table (refer to FIG. 7). Then, it adds the multi-cast IP address to the related data and transfers this to the data storage unit 35.

Simultaneously with that, it outputs the transfer request to the congestion monitor indicating unit 38. This congestion monitor indicating unit 38 communicates with the congestion monitor responding unit 53 of each access server and detects the access server which can send (OK) the related data based on the notification of the congestion state from these responding units 53. Further, the indicating unit 38 sends to the path setting request unit 39 the path switch request to the access server capable of sending the data.

The data transmitting unit 36 reads out the data stored in the data storage unit 35 when there is an access server to which the data can be distributed and transfers this to the data distributing unit 37. The data distributing unit 37 distributes the data to all access servers shown in the destination list written in the header of the data. Accordingly, the path setting request unit 39 sets only the path to an access server not in the congested state. By this, unnecessary multi-casts to access servers in the congested state (NG) are eliminated, whereby discarding of data is prevent.

Figure 16:
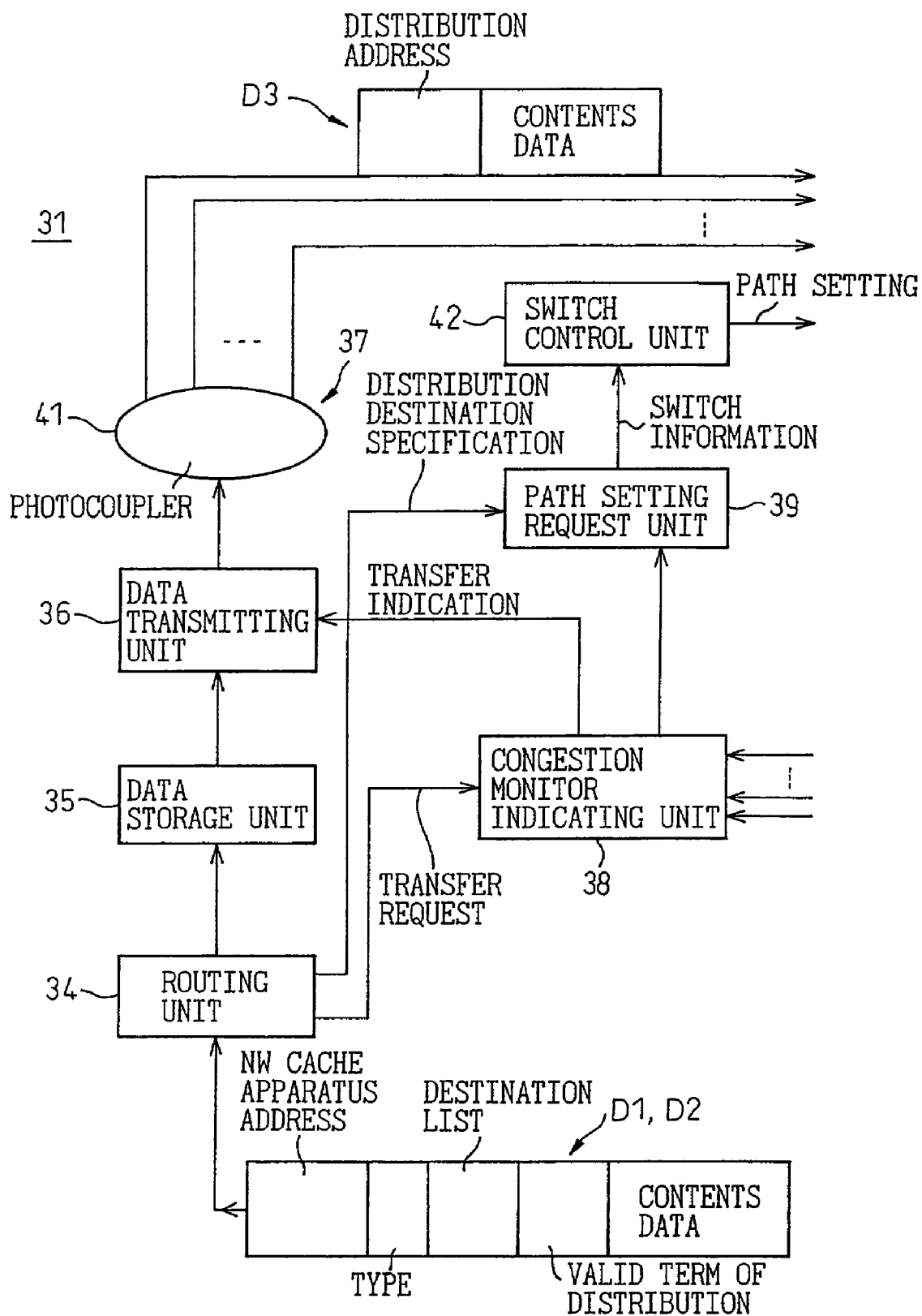
FIG. 16 is a view further concretely showing one part of the configuration of FIG. 14.

FIG. 16 is a view more concretely showing one part of the configuration of FIG. 14.

According to the present figure, the data distributing unit 37 of FIG. 14 is realized by an optical coupler 41. If the exchange function unit 32 is realized by optical cross-connect equipment, the compatibility with this is good.

A detailed description was made above of the configuration of the data distribution system according to the present invention, so finally measures for raising the reliability of this data distribution system will be explained. As this measures, a first measure and a second measure will be mentioned below. The first measure is to utilize a duplex configuration, while a second measure is to utilize a bypass configuration.

Figure 17:
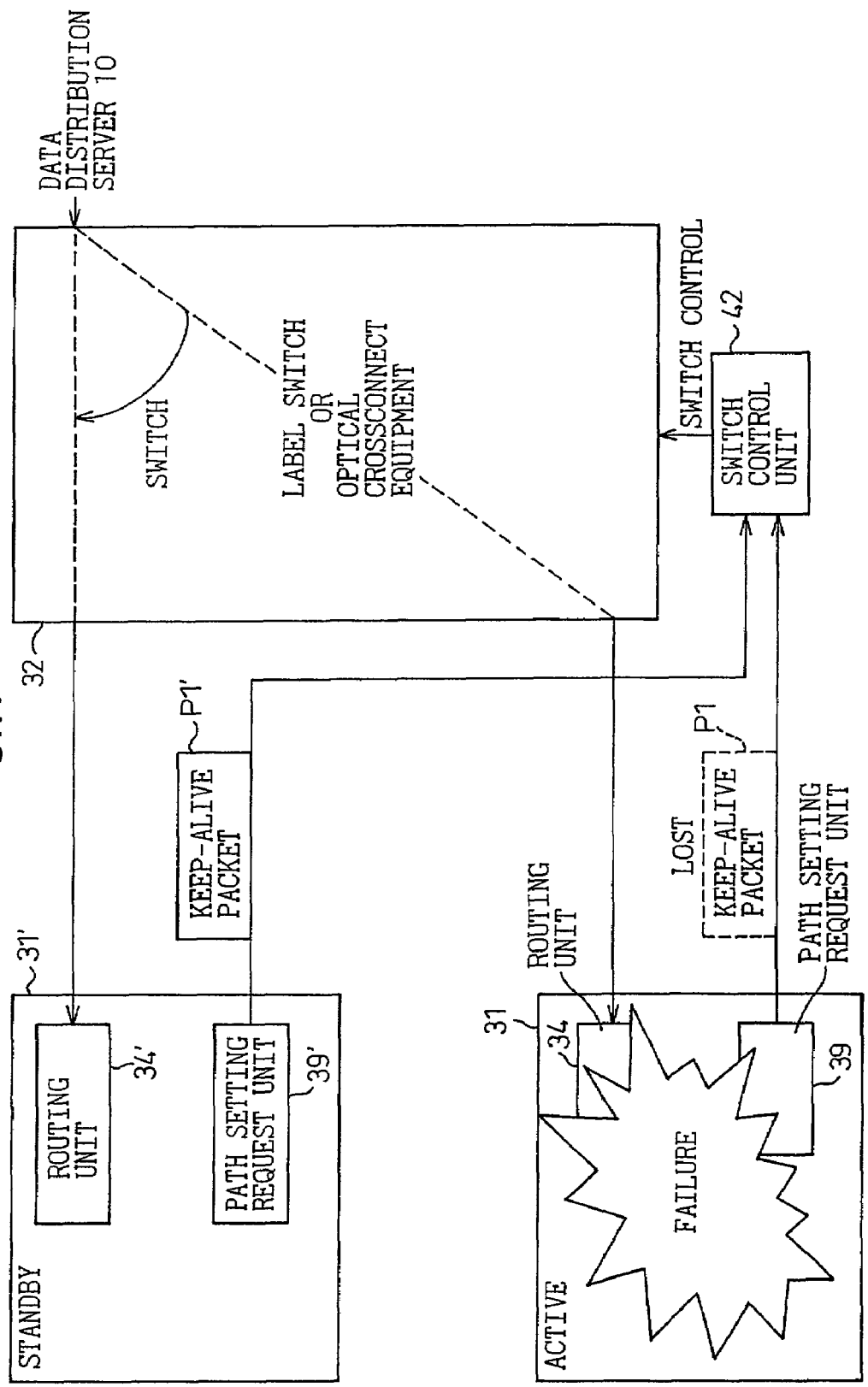
FIG. 17 is a view of an increase of the reliability of the system by a duplex configuration mode.

FIG. 17 is a view of increasing the reliability of the system by a duplex configuration.

As shown in the figure, in the system 1 given higher reliability, the cache function unit is given a duplex configuration. Each of the active cache function unit 31 and standby cache function unit 31' constantly executes transfer of the monitor packets P1 and P1' with the exchange function unit 32. When finding an abnormality ("failure" in the figure) in the active cache function unit 31 being monitored by these monitor packets, the system switches to the standby cache function unit 31' and continues the distribution of the data.

Concretely, these cache function units 31 and 31' periodically transfer a keep-alive packet as the monitor packet from the path setting request units 39 and 39' to the switch control unit 42 of the exchange function unit (label switch or optical cross-connect equipment) 32. The switch control unit 42 monitors for that keep-alive packet and, and when the keep-alive packet does not arrive for a certain period, switches to the standby cache function unit 31'. By this, the system can be protected from the failure of the cache function unit.

Figure 18:
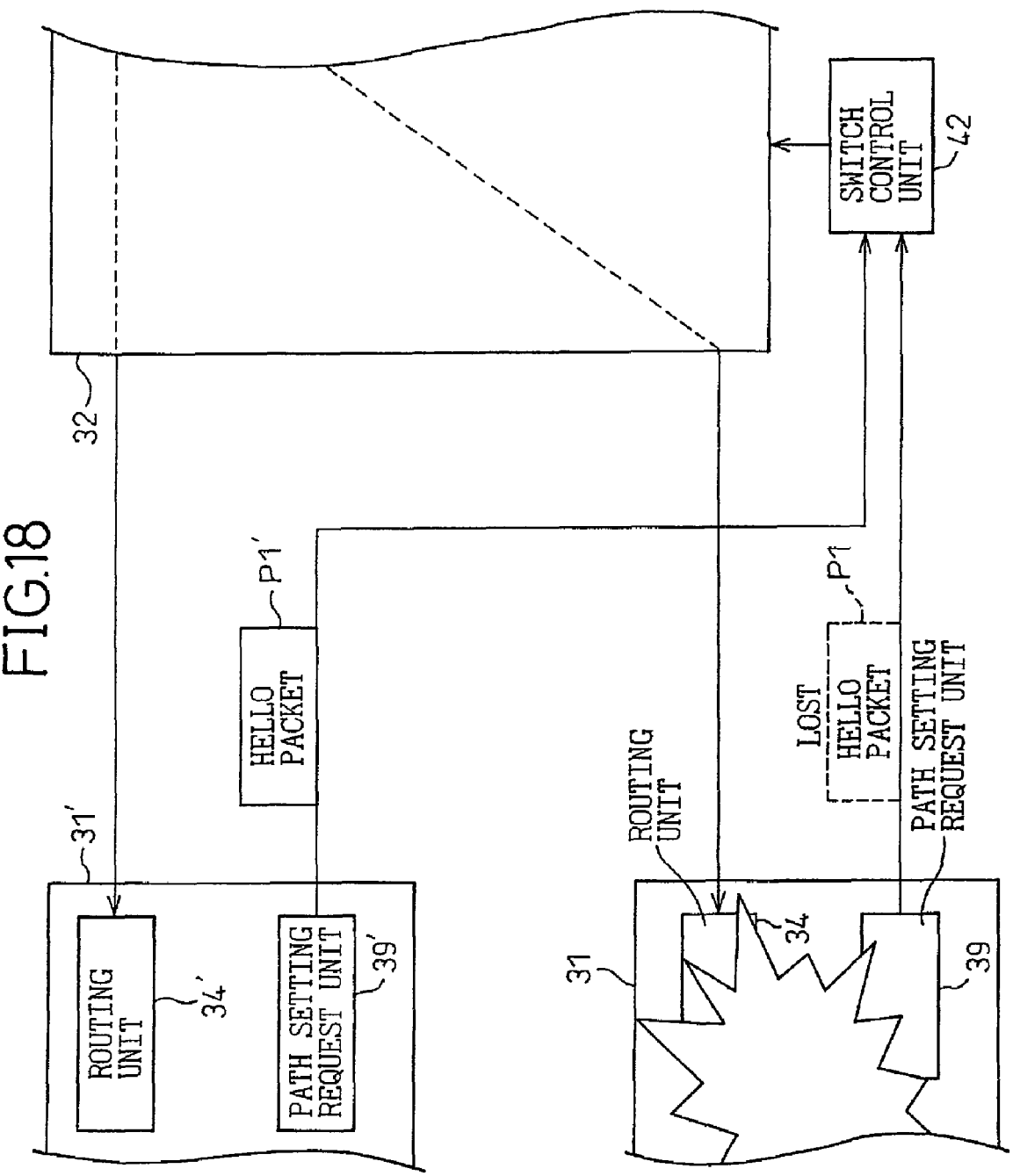
FIG. 18 is a view of a concrete example of a monitor packet in FIG. 17.

FIG. 18 is a view of a concrete example of the monitor packet in FIG. 17.

The monitor packets P1 and P1' are realized by "Hello" packets. A "Hello" packet is sometimes used as a keep-alive packet in an open shortest path first (OSPF) system etc.

FIG. 19 is a view of increasing the reliability of the system by a bypass configuration.

As shown in the figure, in the system 1 given higher reliability, where there are three or more network cache apparatuses 30 inside the network 2 (three in the figure, i.e., #1, #2, #3), all network cache apparatuses 30 are made able to set two or more transmission lines 61 connected to two or more other network cache apparatuses 30. At the same time, a failure monitor means 62 for monitoring for failure of a transmission line 61 is provided in the exchange function unit 32 in each network cache apparatus 30. When detecting failure by this failure monitor means 62, the related failure transmission line is switched to the other transmission line and the distribution of data is continued.

Concretely, each exchange function unit (label switch and optical cross-connect equipment) 32 has a failure monitor means 62 for detecting failure of a transmission line. When failure occurs in the transmission line 61, switch information is transferred between the exchange function units (label switch or optical cross-connect equipment) 32 on the path from the data distribution server 10 to the network cache apparatus concerned in that failure and the switch control unit 42 changes over the switch, whereby the failure is repaired. By this, even if failure occurs in the transmission line, the data can be transferred to the network cache apparatus 30.

FIG. 20 is a view of an example of realization of the failure monitor means 62 of FIG. 19. Note that the present figure includes also the means 62 and a peripheral portion thereof and shows the optical crossconnect equipment as a whole.

In the figure, a data input side wavelength de-multiplexer 23 and transponder 24 are provided on the left side of the optical crossconnect at the center, and a data output side transponder 25 and wavelength multiplexer 26 are provided on the right side of the optical cross-connect.

Among them, the failure monitor means 62 can be realized by the transponder 24. The transponder 24 usually functions to once convert the input optical packet to an electric signal, add a predetermined reproduction, and return this again to the optical packet. If there is an abnormality in the input optical packet, it can be detected in this reproduction operation and thus failure of a transmission line can be found.

Summarizing the effects of the invention, as explained above, according to the data distribution system 1 of the present invention, the data distribution server 10 monitors the congested state of the network cache apparatus 30 in the network 2 and transmits the distribution data to the apparatus 30 when there is no congestion. The network cache apparatus 30 accumulates the transmitted distribution data for a certain valid term. Then, the apparatus 30 monitors the congested state of each access server 50 and distributes the accumulated distribution data to the access server for which no congestion was confirmed from time to time.

As a result, at the distribution of data between the data distribution server 10 and the network cache apparatus 30, unnecessary discards of the data can be suppressed, therefore unnecessary retransmission of data between the two can be prevented. Also, similarly, at the distribution of data between the network cache apparatus 30 and each access server 50, unnecessary discards of the data can be suppressed, therefore unnecessary retransmission of data between the two can be prevented.

Also, the multi-cast of data to each user side server which has been conventionally performed by the data distribution server 10 can be carried out by the exchange function unit 32 of the network cache apparatus 30 on the network 2 side, so the load of the data distribution server 10 is reduced.

While the invention has been described with reference to specific embodiments chosen for purpose of illustration, it should be apparent that numerous modifications could be made thereto by those skilled in the art without departing from the basic concept and scope of the invention.

What is claimed is:

1. A data distribution system comprising:
a data distribution server for supplying data to a user side;
at least one access server provided on the user side and transferring intended data to each user; and
a network cache apparatus provided in a network wherein said data is distributed between said data distribution server and said access server, said network cache apparatus having a cache function unit for temporarily storing said data from said data distribution server and an exchange function unit for routing the stored data to said access server corresponding to a destination user, said cache function unit storing said data for a valid term based on a distribution valid term transferred from said distribution server, simultaneously with said data, the stored data being transmitted to said access server after confirming that a reception buffer of said access server is not in a congestion state, wherein
both said data distribution server and network cache apparatus and both said network cache apparatus and access server are connected via an optical cross-connect equipment forming said exchange function unit of the network cache apparatus and said data is distributed by wavelength multiplex transmission,
said data distribution server is provided with a first congestion monitor indicating unit for transmitting a first inquiry request command to the network cache apparatus and inquiring about the congestion state thereof when said data must be transmitted to said network cache apparatus,
said network cache apparatus is provided with a first congestion monitor responding unit for receiving said first inquiry request command, inquiring about the congestion state thereof, and returning the result to said congestion monitor indicating unit as a first inquiry response, and
said data distribution server transmits said data when said first inquiry response indicates "no congestion".

2. A data distribution system as set forth in claim 1, wherein, where there is only one network cache apparatus in said network,
said data distribution server is provided with a data transmitting unit for generating a packet for transmitting said data and adding a cache specifying address for specifying said network cache apparatus as a destination of transmission to the packet, and
said network cache apparatus is provided with a routing unit for adding a distribution address for setting said access server to which said packet is to be distributed from the destination information contained in said packet to the packet when detecting said cache specifying address directed to itself and transmitting this to said access server side and thereby performs the distribution of said data.

3. A data distribution system as set forth in claim 1, wherein, where there are a plurality of said network cache apparatuses inside said network,
said data distribution server is provided with a data transmitting unit for generating the packet for transmitting said data and adding a cache-specifying multi-cast address for specifying a plurality of said network cache apparatuses as the destination of transmission to the packet, and
each said network cache apparatus further distributes said packet to said network cache apparatus of the next stage based on the cache-specifying multi-address when detecting said cache-specifying multi-address containing the address of itself and each network cache apparatus is provided with a routing unit for adding a distribution address for setting said access server to which said packet is to be distributed from the destination information contained in said packet to the packet and transmitting this to said access server side and thereby performs the distribution of said data.

4. A data distribution system as set forth in claim 1, wherein said network cache apparatus is provided with a second congestion monitor indicating unit for transmitting a second inquiry request command to the access server and inquiring about the congestion state thereof when said data is received from said data distribution server and the data must be transmitted to said access server,
said access server is provided with a second congestion monitor responding unit for receiving said second inquiry request command, inquiring about the congestion state thereof, and returning the result as a second inquiry response to said second congestion monitor indicating unit, and
said network cache apparatus transmits said data when said second inquiry response indicates "no congestion".

5. A data distribution system as set forth in claim 1, giving said cache function unit a duplex configuration, having each of an active cache function unit and a standby cache function unit constantly execute transfer of a monitor packet with said exchange function unit, and, when finding an abnormality in said active cache function unit monitored by the monitor packet, switching to said standby cache function unit to continue the distribution of said data.

6. A data distribution system as set forth in claim 1, wherein, when there are three or more network cache apparatuses inside said network, all network cache apparatuses are made able to set two or more transmission lines connected to two or more other network cache apparatuses, a failure monitor means for monitoring for failure of a transmission line is provided in said exchange function unit in each said network cache apparatus, and, when detecting the occurrence of said failure by the failure monitor means, the related failure transmission line is switched to another transmission line and the distribution of said data is continued.

7. A data distribution server placed on an outside of a network,
receiving data from the outside, temporarily holding this, communicating with a network cache apparatus provided in said network for routing the held data to a user side, and distributing said data to a user outside said network,
wherein a valid term of the distribution is sent to said network cache apparatus simultaneously with said data, and said data is transmitted to said cache apparatus after confirming that a reception buffer of said cache apparatus is not in a congestion state,
wherein both said data distribution server and network cache apparatus and both said network cache apparatus and user side are connected via an optical cross-connect, and said data is distributed by wavelength multiplex transmission,
wherein a congestion monitor indicating unit for outputting a send instruction is provided, and the congestion monitor indicating unit transmits an inquiry request command with respect to the network cache apparatus to inquire about the congestion state thereof when said data and information are to be transmitted to said network cache apparatus,
wherein said data distribution server is provided with a first congestion monitor indicating unit for transmitting a first inquiry request command to the network cache apparatus and inquiring about the congestion state thereof when said data must be transmitted to said network cache apparatus,
wherein said network cache apparatus is provided with a first congestion monitor responding unit for receiving said first inquiry request command, inquiring about the congestion state thereof, and returning the result to said congestion monitor indicating unit as a first inquiry response, and
wherein said data distribution server transmits said data when said first inquiry response indicates "no congestion".

8. A data distribution server as set forth in claim 7, wherein provision is made of a data transmitting unit for generating a packet for transmitting said data and adding a cache-specifying address for specifying said network cache apparatus as the destination of transmission to the packet and adding a cache-specifying multi-cast address for specifying a plurality of said network cache apparatuses as the destination of transmission to the packet where there are a plurality of said network cache apparatuses in said network.

9. A data distribution server as set forth in claim 8, wherein said data transmitting unit is linked with a data access request receiving unit for accepting a send request of said data from a data provider or an access request of said data from the user and outputs information concerning at least a destination list of the destination of distribution of said data and the valid term of the distribution together with the related data from the data access request receiving unit.

10. A data distribution server as set forth in claim 8, wherein provision is further made of a data storage unit for storing said data and information output from said data access request receiving unit for the valid term and said stored data and information are transmitted from said data transmitting unit to said network cache apparatus according to a send instruction.

11. A network cache apparatus comprising:
a cache function unit linked with both a data distribution server for supplying data to a user side and at least one access server provided on the user side and transferring intended data to users, said cache function unit temporarily storing said data from said data distribution server; and
an exchange function unit for routing the stored data to said access server corresponding to a destination user, said cache function unit storing said data for a valid term based on a distribution valid term transferred from said distribution server simultaneously with said data, the stored data being transmitted to said access server after confirming that a reception buffer of said access server is not in a congestion state,
wherein both said data distribution server and network cache apparatus and both said network cache apparatus and access server are connected via an optical cross-connect equipment forming said exchange function unit of the network cache apparatus and said data is distributed by wavelength multiplex transmission,
wherein said cache function unit has a congestion monitor responding unit for performing an inquiry in response to an inquiry request of the congestion state from said data distribution server and returning the result to the data distribution server,
wherein said data distribution server is provided with a first congestion monitor indicating unit for transmitting a first inquiry request command to the network cache apparatus and inquiring about the congestion state thereof when said data must be transmitted to said network cache apparatus,
wherein said network cache apparatus is provided with a first congestion monitor responding unit for receiving said first inquiry request command, inquiring about the congestion state thereof, and returning the result to said congestion monitor indicating unit as a first inquiry response, and
wherein said data distribution server transmits said data when said first inquiry response indicates "no congestion".

12. A network cache apparatus as set forth in claim 11, wherein said cache function unit has
a routing unit for receiving said data and information concerned with at least a distribution destination list of the data and the distribution valid term thereof from said data distribution server and controlling a distribution of the data to said access server corresponding to the user as the destination of the distribution via said exchange function unit and
a data storage unit for storing the data from said routing unit for the valid term.

13. A network cache apparatus as set forth in claim 12, wherein said routing unit creates a routing table listing a group of addresses of the distribution destinations based on said information and specifies said user as the destination of the distribution according to the routing table.

14. A network cache apparatus as set forth in claim 12, wherein said cache function unit has a congestion monitor indicating unit, and the congestion monitor indicating unit transmits an inquiry request command to the access server when said data is to be transmitted to said access server and confirms whether or not the inquiry response indicates "no congestion".

15. A network cache apparatus as set forth in claim 14, wherein said cache function unit has a data transmitting unit, and the data transmitting unit transfers said data stored in said data storage unit toward said exchange function unit when said inquiry response indicates "no congestion".

16. A network cache apparatus as set forth in claim 15, wherein
said routing unit creates the routing table listing the group of addresses of the destinations of the distribution based on said information and specifies said user as the distribution destination according to the routing table, said cache function unit has a data distributing unit, and the data distributing unit transfers the data from said data transmitting unit to said exchange function unit toward said user as the destination of the distribution specified according to said routing table.

17. A network cache apparatus as set forth in claim 16, wherein
said cache function unit has a path setting request unit, and
the path setting request unit performs the route setting toward said user as the destination of distribution specified according to said routing table with respect to said exchange function unit.

18. A network cache apparatus as set forth in claim 17, wherein said path setting request unit selectively performs said route setting with respect to the access server for which said inquiry response indicates "no congestion" among a plurality of said access servers and prohibits the transfer of said data to be distributed to the access server from said data distributing unit with respect to an access server for which said inquiry response does not indicate "no congestion".

* * * * *